(12) United States Patent
Elenbaas et al.

(10) Patent No.: US 11,975,267 B2
(45) Date of Patent: May 7, 2024

(54) SYNCHRONIZATION OF PHYSIOLOGICAL DATA AND GAME DATA TO INFLUENCE GAME FEEDBACK LOOPS

(71) Applicant: Virtual Therapeutics Corporation, Kirkland, WA (US)

(72) Inventors: Daniel James Elenbaas, Redmond, WA (US); Trond Nilsen, Snohomish, WA (US)

(73) Assignee: Virtual Therapeutics Corporation, Kirkland, WA (US)

( * ) Notice: Subject to any disclaimer, the term of this patent is extended or adjusted under 35 U.S.C. 154(b) by 66 days.

(21) Appl. No.: 17/088,019

(22) Filed: Nov. 3, 2020

(65) Prior Publication Data

US 2021/0129032 A1    May 6, 2021

Related U.S. Application Data

(60) Provisional application No. 62/930,097, filed on Nov. 4, 2019.

(51) Int. Cl.
*A63F 13/67*  (2014.01)
*A63F 13/212* (2014.01)

(52) U.S. Cl.
CPC ............ *A63F 13/67* (2014.09); *A63F 13/212* (2014.09)

(58) Field of Classification Search
CPC ...... A63F 13/211; A63F 13/212; A63F 13/65; A63F 13/67
See application file for complete search history.

(56) References Cited

U.S. PATENT DOCUMENTS

| 10,773,122 | B2 | 9/2020 | Orr | |
| 2009/0098519 | A1* | 4/2009 | Byerly | G09B 23/28 463/7 |
| 2011/0009193 | A1* | 1/2011 | Bond | A63F 13/65 463/36 |
| 2014/0012509 | A1* | 1/2014 | Barber | G06F 3/013 702/19 |
| 2014/0171201 | A1 | 6/2014 | May | |

(Continued)

OTHER PUBLICATIONS

PCT International Search Report and Written Opinion; Application No. PCT/US2020/058675 Virtual Therapeutics International filing date Nov. 3, 2020, dated Feb. 1, 2021, 19 pages.

(Continued)

*Primary Examiner* — James S. McClellan
*Assistant Examiner* — Ross A Williams
(74) *Attorney, Agent, or Firm* — Patent Law Works, LLP; Greg T. Sueoka

(57) ABSTRACT

A system and method for synchronizing sensor data and game event data to influence a subsequent game event are described herein including: presenting a first instance of a first game event; associating the first instance of the first game event with a first set of one or more time stamps; receiving readings from one or more biosensors indicating at least one physiological measure of a user; associating at least some of the readings with respective time stamps, wherein the first set of one or more time stamps and the respective time stamps share a common time standard; determining a subsequent game event using a first set of one or more readings; and presenting the subsequent game event.

20 Claims, 18 Drawing Sheets

(56) References Cited

U.S. PATENT DOCUMENTS

| | | | |
|---|---|---|---|
| 2014/0200691 A1* | 7/2014 | Lee | A61B 5/681 |
| | | | 700/91 |
| 2015/0093729 A1* | 4/2015 | Plans | G09B 5/00 |
| | | | 434/262 |
| 2015/0196804 A1* | 7/2015 | Koduri | G06V 40/23 |
| | | | 482/8 |
| 2016/0093154 A1* | 3/2016 | Bytnar | G07F 17/3237 |
| | | | 463/25 |
| 2017/0087460 A1 | 3/2017 | Perry | |
| 2017/0229149 A1 | 4/2017 | Rothschild et al. | |
| 2017/0216675 A1* | 8/2017 | Goslin | G06T 19/006 |
| 2018/0103867 A1* | 4/2018 | Stephens | A61B 5/486 |

OTHER PUBLICATIONS

Extended European Search Report issued for EP application No. 20885924.9, mailed Nov. 9, 2023, 8 pgs.

* cited by examiner

SYNCHRONIZATION OF PHYSIOLOGICAL DATA AND GAME DATA TO INFLUENCE GAME FEEDBACK LOOPS

CROSS-REFERENCE TO RELATED APPLICATIONS

The present application claims priority to U.S. Provisional Application No. 62/930,097, filed Nov. 4, 2019, titled "Synchronization of Physiological Data and Game Data to Influence Game Feedback Loops," the entirety of which is hereby incorporated by reference.

BACKGROUND

Various sensors exist for detecting a physiological condition or response to a stimulus, for example, a pulse. Games may be controlled or influenced by user inputs received via a game controller. However, games do not use a physiological response of a user to a game event to modify a subsequent game event or include a mechanism to do so.

SUMMARY

In general, an innovative aspect of the subject matter described in this disclosure may be embodied in methods that include one or more processors presenting a first instance of a first game event on one or more user interfaces; associating the first instance of the first game event with a first set of one or more time stamps; receiving readings from one or more biosensors, the readings indicating at least one physiological measure of a user; associating at least some of the readings with respective time stamps, where the first set of one or more time stamps and the respective time stamps share a common time standard; determining a subsequent game event using a first set of one or more readings, at least one reading of the first set of one or more readings being associated with a time stamp corresponding to a time occurring during or after the first set of one or more time stamps; and presenting the subsequent game event on the one or more user interfaces.

According to another innovative aspect of the subject matter described in this disclosure, a system comprises a processor; and a memory storing instructions that, when executed, cause the system to: present a first instance of a first game event on one or more user interfaces; associate the first instance of the first game event with a first set of one or more time stamps; receive readings from one or more biosensors, the readings indicating at least one physiological measure of a user; associate at least some of the readings with respective time stamps, where the first set of one or more time stamps and the respective time stamps share a common time standard; determine a subsequent game event using a first set of one or more readings, at least one reading of the first set of one or more readings being associated with a time stamp corresponding to a time occurring during or after the first set of one or more time stamps; and present the subsequent game event on the one or more user interfaces.

Other implementations of one or more of these aspects include corresponding systems, apparatus, and computer programs, configured to perform the actions of the methods, encoded on computer storage devices. These and other implementations may each optionally include one or more of the following features.

The features may include determining the subsequent game event using a second set of one or more readings, at least one of the second set of one or more readings associated with a time stamp indicating a time occurring before any time stamp of the first set of one or more time stamps; and comparing a function of the first set of one or more readings to a function of the second set of one or more readings. The features may include presenting a second instance of the first game event on the one or more user interfaces; associating the second instance of the first game event with a second set of one or more time stamps; and determining the subsequent game event using a second set of one or more readings, at least one reading of the second set of one or more readings being associated with a time stamp corresponding to a time occurring during or after the second set of time stamps. The features may include may include presenting a second instance of the first game event through the one or more user interfaces; associating the second instance of the first game event with a third set of time stamps, at least one of the third set of time stamps corresponding to a time occurring: before a first time indicated by at least one of the second set of one or more time stamps; and after a second time indicated by at least one of the second set of one or more time stamps. The features may include presenting a second instance of the first game event through the one or more user interfaces; and associating the second instance of the first game event with a third set of time stamps, at least one of the third set of time stamps corresponding to a time occurring within a maximum amount of time of a time indicated by at least one of the second set of one or more time stamps. The features may include presenting a second game event through the one or more user interfaces; associating the second game event with a second set of one or more time stamps; and determining the subsequent game event using a second set of one or more readings, at least one reading of the second set of one or more readings associated with a time stamp corresponding to a time occurring during or after the second set of one or more time stamps. The features may include that the one or more biosensors may include a sensor measuring heart activity, the one or more processors generate a first measure of heart rate variability using the first set of one or more readings, the one or more processors generate a second measure of heart rate variability using the second set of one or more readings, the first value is a first measure of stimulus intensity, the second value is a second measure of stimulus intensity, and the one or more processors determine the subsequent game event using a measure of a relationship between heart rate variability and stimulus intensity. The features may include that the one or more biosensors may include a sensor measuring breathing of the user, the one or more processors generate a first measure of breathing rate using the first set of one or more readings, the one or more processors generate a second measure of breathing rate using the second set of one or more readings, the first value is a first measure of stimulus rate, the second value is a second measure of stimulus rate, and the one or more processors determine the subsequent game event using a measure of a relationship between breathing rate and stimulus rate. The features may include receiving outputs from one or more game control devices, the outputs indicating actions of the user; associating at least some of the outputs with respective time stamps of the common time standard; and determining the subsequent game event using one or more of the outputs, at least one output of the one or more outputs associated with a time stamp corresponding to a time occurring during or after the first set of one or more time stamps. The first instance of the first game event is associated with an event data array may include a time, a name, and one or more expected data fields, the one or more expected data fields defined for a type of the first game event. The subsequent game event is determined to elicit a specified physiological response in the user. The subsequent game event includes a completion criterion modified based on the first set of one or more readings.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1:
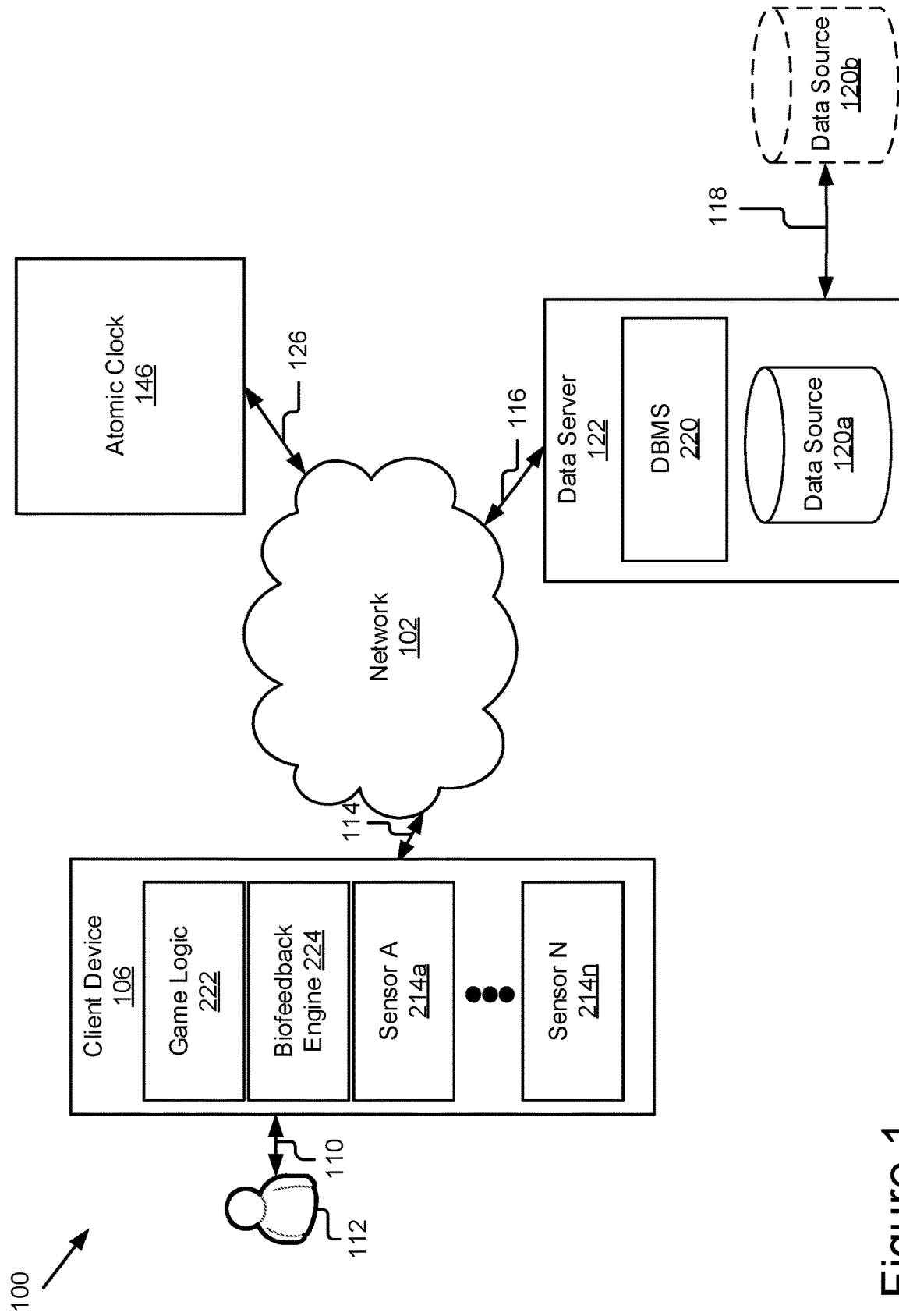
FIG. 1 presents a schematic diagram of an example system in which physiological readings influence computer games, according to certain embodiments of the present disclosure.

The techniques introduced herein overcome the deficiencies and limitations of the prior art at least in part by providing systems and methods for building simultaneous interactive experiences. It should be understood that the language used in the present disclosure has been principally selected for readability and instructional purposes, and not to limit the scope of the subject matter disclosed herein.

The present disclosure describes systems and methods for building simultaneous interactive experiences. In the following descriptions, for purpose of explanation, numerous specific details are set forth in order to provide a thorough understanding of the present disclosure. However, it should be noted that the present disclosure might be practiced without these specific details.

When an individual has a physiological reaction following a series of stimuli, it may not be clear what aspect of those stimuli triggered the physiological reaction. Unlike experiences in the real world, a computer game can precisely control the stimuli that its user experiences. Multiple stimuli may be presented simultaneously or with a precise time delay between them. A series of stimuli may be presented repeatedly either in exact repetitions or with specific changes. The frequency and intensity of stimuli may be adjusted. Common user interface outputs through which games may be presented include visual images generated by a display screen and sounds generated by a speaker. Examples of tactile outputs include vibrations and refreshable braille displays. Virtual reality (VR) may refer generally to experiences conveyed through a display screen coupled to the user's face. The images the VR screen displays change according to the position and orientation of the user's face and may create the illusion that the user is viewing three-dimensional objects from different perspectives. VR may provide a particularly immersive experience and an experience whose details can be completely controlled and precisely adjusted. Augmented reality is a further adaptation of VR that superimposes software-generated images over a background of what is actually in front of the user.

Reactions to stimuli may manifest themselves as observable physiological responses. Physiological measures may include, but are not limited to, heart rate, heart rate intervals, heart rate variability, breathing rate, breath volume, breath level and breathing intensity, sweat concentration, body temperature, blood pressure, eye movement, head position and rotation, and movements of various muscles. Each of these physiological indicators may be measured using various types of biosensors. For instance, electrocardiography (ECG) or photoplethysmography (PPG) may be used to detect heart contractions and derived measures such as heart rate and heart hate variability (HRV). Breath position may be measured using sensors that detect the position of or force within straps secured around the rib cage. Derived measures such as breathing rate and breath volume may be derived from measurements of breath position. Thermocouples and thermistors measure temperature which, in turn, may be indicative of metabolic rate. Electrical properties of the skin (such as resistance, potential, impedance, and admittance) may be indicative of physiological properties such as arousal of the sympathetic nervous system. Muscle movement may be determined using electromyography. Blood pressure may be measured using a variety of automated means including oscillometry and sphygmomanometry. Eye movement can be quantified by analyzing video recordings of eyes. Cameras in communication with image processing functionality may quantify the frequency and speed of a person's body movements. Neural activity may be measured in different parts of the brain or body using a variety of techniques including electro-encephalography (EEG), position electron tomography (PET), and functional MRI (fMRI).

Game outputs may be controlled or influenced by a variety of inputs from a user. Hardware capturing game inputs include, for example, buttons, joysticks, accelerometers, and gyroscopes under conscious control of the user. While existing games may measure the user's physiological responses to a game generally, they do not associate physiological responses to particular game events that, in turn, influence subsequent game events in complex and nuanced ways. Such physiological game feedback loops may have a broad range of uses including tuning of games to optimal intensity levels as well as therapeutic applications.

Example System Embodiments

FIG. 1 presents a schematic diagram of an example system in which physiological readings influence computer games, according to certain embodiments of the present disclosure. The illustrated system 100 includes a client device 106, an atomic clock, 146, and a data server 122, which are communicatively coupled via a network 102 for interaction with one another. For example, the client devices 106 may be coupled to the network 102 via signal line 114. The data server 122 may be coupled to the network 102 via signal line 116. The atomic clock 146 may be coupled to the network 102 via signal line 126. In some embodiments, the client device 106 may be accessed by a user 112 as illustrated by line 110. The data server 122 may include one or more data sources (referred to individually as data source 120 and collectively as data sources 120). The one or more data sources may be included in the data server 122 as illustrated by data source 120a, coupled to the data server 122 as a direct access storage (DAS) illustrated by data source 120b and line 118, coupled to the data server 122 via the network 102 as a network accessible storage (NAS) (not shown), or a combination thereof.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the hypertext markup language (HTML), the extensible markup language (XML), JavaScript Object Notation (JSON), Binary JavaScript Object Notation, Comma Separated Values (CSV), etc. In addition, all or some of links can be encrypted using conventional encryption technologies, for example, the secure sockets layer (SSL), Secure Hypertext Transfer Protocol (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

The client device 106 is a computing device having data processing and communication capabilities. While FIG. 1 illustrates one client device 106, the present specification applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, input devices (e.g. mouse, keyboard, controller, camera, sensors, etc.) firmware, operating systems, drivers, various physical connection interfaces (e.g., USB, HDMI, etc.). The client devices 106 may couple to and communicate with one another and the other entities (e.g. data server 122) of the system 100 via the network 102 using a wireless and/or wired connection.

Examples of client devices 106 may include, but are not limited to, VR headset (e.g. Oculus Quest 2, Sony PlayStation VR, HTC Vive Cosmos, etc.), mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While one client device 106 is depicted in FIG. 1 for clarity and convenience, the system 100 may include any number of client devices 106. In addition, the any number of client devices 106 may be of the same type or different types of computing devices. In the depicted embodiment, the client device 106 includes an instance of game logic 222, an instance of the biofeedback engine 224, an output device 210, an input device 212, and sensors—sensor A 214 and sensor N 214n.

The game logic 222 may be storable in a memory and executable by a processor of a client device 106. In one embodiment, the game logic 222, when executed by the processor, enables a user to play a game including one or more game events. As used herein, a game may refer to any instructions and/or memory states that determine a sequence of perceptible outputs generated by a computer through a user interface, wherein such stimuli are linked together through a set of logical processes into a simulation whereby inputs received from a human player influence the outputs according to a set of pre-defined rules. Inputs received from the human user may comprise, for example, physiological readings from a biosensor or conscious manipulation of a game control device. As used herein, a game event (or simply "event") may refer to a response of computing hardware to an input wherein the response occurs within a given time period and may take the form of either (a) one or more stimuli generated by a user interface or (b) one or more changes in a memory state of a game and wherein the input may be generated by either (i) a player of the game or (ii) a processor's execution of the game's instructions. By way of example, and without limitation, a game event may comprise a single screen image, a portion of a screen image, a representation of a three-dimensional object (which could be manifest in multiple potential screen images depending on the virtual viewing angle and distance), a series of screen images, a series of images comprising a portion of the screen, a series of representations of a three dimensional objects, a sound, series of sounds, a tactile output or series of tactile outputs. A game event may be a characteristic or change in characteristics of the outputs of a user interface. For example, a game event may be a change in image brightness or sound volume.

A game event may or may not be triggered by actions of the user. For example, a game event may be based on an action (e.g. AI-based or random behavior) of a computer character, an outcome of a simulation procedure (e.g. a simulated plant's growth exceeds a threshold), or scripted events (e.g. a dancing character finishes dancing and leaves the stage). Some game events may be triggered, for example, by the passage of a period of time without user action. In some embodiments, game events may comprise, for example, the starting of a timer in absence of user action that will trigger particular stimuli at a future time. An instantaneous event is associated with a single time stamp while an interval event is associated with at least two time stamps indicating a start time and an end time of the interval event. Multiple game events may (but are not required to) be present at a single time.

In one embodiment, the game logic 222 provides event data to the biofeedback engine 224, which may be used as described further below to modify a subsequent game event based on a user's physiological response to a game event.

In one embodiment, the game logic 222 includes a set of subscriptions to a set of biofeedback algorithms. For example, the game logic 222 may include a subscription to a biofeedback algorithm associated with range of motion, so that the biofeedback engine 224 may determine a presentation of a subsequent game event, by the game logic 222, based on the limits of the user's range of motion. In another example, the game logic 222 may include a subscription associated with fear, and based on one or more of the user holding his/her breath, his/her pulse, and sweating as determined using sensors, the biofeedback engine 224 may determine a presentation of a subsequent game event, by the game logic 222, to induce the desired level of fear (e.g. a specified rise in heartbeat, holding of breath, electrodermal activity, galvanic skin response, skin temperature).

The biofeedback engine 224 may be storable in a memory and executable by a processor of a client device 106. The biofeedback engine 224 applies a biofeedback algorithm to synchronized event and sensor data to modify presentation of a subsequent game event by the game logic 222. Examples of modifications may include, but are not limited to, altering a narrative of the game (e.g. presenting event 2a vs. event 2b based on the user's physiological response to a first event), altering a parameter associated with a subsequent game event (e.g. speed of enemy character, number of enemy characters, threshold for completing an in-game task, or event, a stimulus intensity such as a volume of game audio, screen brightness or contrast, haptic feedback intensity, etc.). A threshold for completing an in-game task, or event, may also occasionally be referred to as a completion criterion. Examples of completion criterion may include, by way of example and not limitation, one or more of a number of actions to be taken (e.g. do 10 repetitions), a time in which to perform a number of actions (e.g. within a minute), a ranking needed in order to advance (e.g. get $1^{st}$ place), another metric (e.g. collect 10 coins, get more than 10,000 points in the level, obtain a heart rate of 100 BPM, obtain a flexion in the knee of X degrees), etc. In some implementations, satisfying a completion criterion may be necessary to advance the narrative of a game (e.g. to complete a level), win a prize (e.g. a digital trophy or badge), or change a diagnosis (e.g. a change in a scheduled rating for an impairment).

In one embodiment, the implementation of the game logic 222 and the biofeedback engine 224 decouples the development cycles of game content and biofeedback algorithm generation. For example, generating new games or adding additional events to an existing game may occur more quickly compared to the research, testing, and approval of a biofeedback algorithm. Therefore, in one embodiment, the game logic 222 subscribes to a biofeedback algorithm and version, which may be updated, for example, as new algorithms are deployed by biofeedback algorithm module 240.

Depending on the game logic 222 and the use case a biofeedback algorithm may be provide one or more potential benefits including, e.g., therapeutic results and user engagement. Regarding therapeutic results, in one embodiment, the game logic 222 may be a game to address a cognitive behavior (e.g. fear of public speaking, quitting smoking, anxiety, etc.) and the biofeedback algorithm may be designed to help a user address or overcome the cognitive behavior. For example, a game to overcome a fear of public speaking presents a VR environment with a number of audience members that mildly triggers the user's fear of speaking, but not to a level where they shut down, and the game can slowly increase the audience size as the user acclimates to a large and larger audience. In one embodiment, the game logic 222 may be a game to address a physical condition (e.g. an injury, chronic back pain) and the biofeedback algorithm may be designed to help a user address or improve the physical condition. For example, a physical therapy game for rehabilitating from a rotator cuff injury may be adjusted to restrict the necessary range of motion of a user's shoulder within subsequent game events to a certain range, certain speeds, and a certain number or repetitions based on sensor data received during a calibration event.

Regarding user engagement, in one embodiment, the game logic 222 may be a game to increase user engagement. User engagement may be increased by a number of mechanisms. For example, user engagement with the game logic 22 (e.g. amount of time played) may be increased by adjusting thresholds for completing tasks to optimize the difficulty or time needed to complete the task so that the user stays in the flow of the game and does not become bored (e.g. too easy or too slow to progress) or frustrated (e.g. to difficult to complete). In another example, user engagement with the game logic 222 by inducing a desired physiological response, for example, fear, excitement, or satisfaction and accompanying releases of adrenaline or dopamine to reinforce game play.

The data server 122 may include one or more computing devices having data processing, storing, and communication capabilities. For example, the data server 122 may include one or more hardware servers, server arrays, storage devices, systems, etc., and/or may be centralized or distributed/cloud-based. In some implementations, the data server 122 may include one or more virtual servers, which operate in a host server environment and access the physical hardware of the host server including, for example, a processor, memory, storage, network interfaces, etc., via an abstraction layer (e.g., a virtual machine manager).

In one embodiment, the data server 122 includes the DBMS 220 module. The DBMS 220 module may be storable in a memory and executable by a processor of a data server 122 to provide access to data stored by a data source 120. For example, in one embodiment, the DBMS 220 provides access to data stored by a data source 120 via the network 102. A data source 120 may be stored on one or more non-transitory computer-readable mediums for storing data.

While a single data server 122 is illustrated in FIG. 1, it should be understood that this is merely an example, and that other embodiments may include any number of data servers 122 or may omit the data server 122. The data sources 120 and data stored thereon may vary based on the embodiment. Examples of data sources 120 include, by way of example and not limitation, an insurance data source (e.g. from a data server 122 associated with a medical insurance provider), demographic data, patient data (e.g. from an medical history electronic medical record (EMR) via a data server 122 associated with a medical provider such as a clinic, hospital, clinical context including prescription or other or concurrent therapies, etc.), survey data (e.g. of user responses to a game or treatment), usage data (e.g. time of use, frequency of use, duration of use), research data, clinical trial data, other data (e.g. financial, phone and internet usage, etc.)

It should be understood that the system 100 illustrated in FIG. 1 is representative of an example system according to one embodiment and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side.

Further, various entities of the system 100 may be integrated into to a single computing device or system or additional computing devices or systems may be included. For example, in one embodiment, the game logic 222 may, in whole (e.g. a cloud-based game) or in part, be included on a server (not shown). In another example, in one embodiment, the biofeedback engine 224 may, in whole or in part, be included on a server (not shown). For example, in one such embodiment, remote sensor data may be processed on a server and local sensor data may be processed locally (on the client device 106) to reduce latency.

Figure 2:
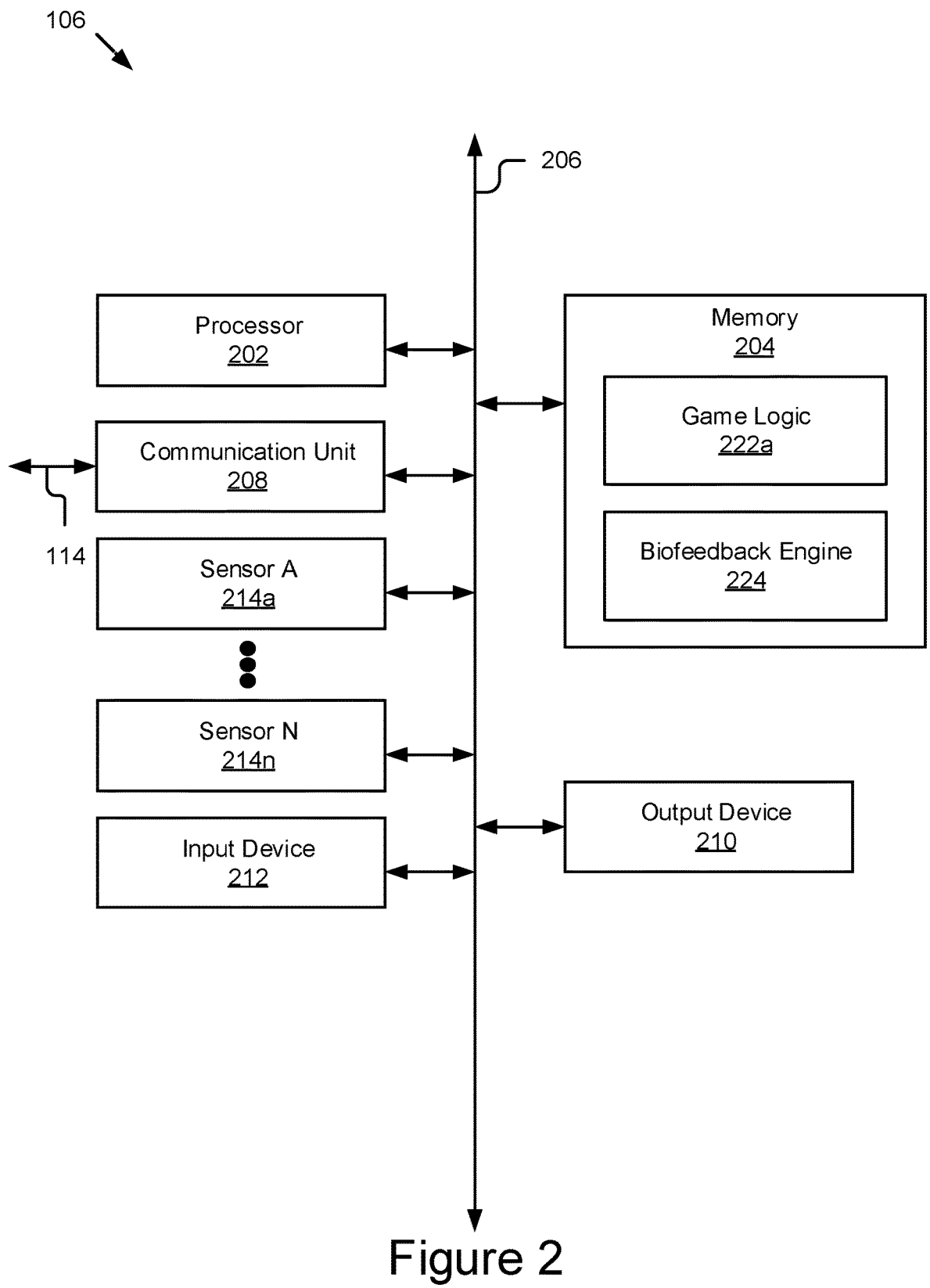
FIG. 2 presents a block diagram of an example client device, according to certain embodiments of the present disclosure.

FIG. 2 is a block diagram of an example client device 106 according to one embodiment. The client device, as illustrated, may include a processor 202, a memory 204 and a communication unit 208, which may be communicatively coupled by a communications bus 206. The client device 106 depicted in FIG. 2 is provided by way of example and it should be understood that it may take other forms, other physical configurations, and include additional or fewer components without departing from the scope of the present disclosure. For example, while not shown, an input device 212 and output device 210 may be a single device (e.g., a touch screen which receives inputs and presents a visual user interface, or a VR headset which includes an output device 210, i.e. the display, and a sensor 214, i.e., a gyroscope.

The processor 202 may execute code, routines and software instructions by performing various input/output, logical, and/or mathematical operations. The processor 202 have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to an output device 210, supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the client device 106 including, for example, the memory 204 and communication unit 208.

The memory 204 may store and provide access to data to the other components of the client device 106. In some implementations, the memory 204 may store instructions and/or data that may be executed by the processor 202. For example, in the illustrated embodiment, the memory 204 may store the game logic 222 and the biofeedback engine 224. The memory 204 is also capable of storing other instructions and data, including, for example, an operating system, hardware drivers, other software applications, databases, etc. The memory 204 may be coupled to the bus 206 for communication with the processor 202 and the other components of the client device 106.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some embodiments, the memory 204 may include one or more of volatile memory and non-volatile memory. For example, the memory 204 may include, but is not limited, to one or more of a dynamic random access memory (DRAM) device, a static random access memory (SRAM) device, a discrete memory device (e.g., a PROM, FPROM, EPROM, EEPROM, ROM), a hard disk drive (HDD), an optical disk drive (CD, DVD, Blu-ray™, etc.). It should be understood that the memory 204 may be a single device or may include multiple devices, multiple types of devices, and multiple configurations.

In one embodiment, the processor 202 may be communicatively coupled to and execute instructions comprising the biofeedback engine 224 stored on the memory 204, which cause the processor 202 to present a game event on one or more user interfaces (e.g. via output device 210), associate the game event with at least one time stamp, associate at least some readings from a physiological sensor 214 with time stamps using the same time standard as the time stamps associated with the game event, determine a subsequent game event using a first set of readings generated during or after the first game event as determined by the time stamps associated with the readings and the one or more time stamps associated with the game event, and present the subsequent game event on the one or more user interfaces.

In some embodiments the processor 202 executes instructions (e.g. the biofeedback engine 224) for selecting a subsequent game event. In some embodiments of the method, one or more processors (sometimes referred to collectively as "processing") associate both a game event presented to a user and physiological data generated by the user (as captured by one or more sensors) with respective time stamps. Each of the time stamps is synchronized to a single time standard so that temporal occurrence of the physiological readings relative to presentation of the game event may be determined. When the game is an instantaneous event, it may be associated with a single time stamp. When the event is an interval event, it may be associated with multiple time stamps. In some embodiments, each reading from the one or more sensors 214 is associated with a time stamp. However, those familiar with the art will understand that substantially similar results may be obtained even when not all of the readings are associated with time stamps. A physiological response to a game event may be determined from physiological readings that were generated during (for interval events) or after (for instantaneous or interval events) presentation of the game event. That is, a physiological response to the game event may be determined by processing physiological readings associated with time stamps indicating a time after the time stamp indicating the start of the game event. A data structure with readings and associated time stamps may be particularly useful when there are multiple sensors and multiple game events overlapping each other. Such a structure may be used to determine which game event (or combination of game events) triggered a particular physiological response.

The bus 206 can include a communication bus for transferring data between components of a client device 106 and/or between computing devices (e.g. the client device and gaming server 156), a network bus system including the network 102 or portions thereof, a processor mesh, a combination thereof, etc. In some implementations, the game logic 222, biofeedback engine 224, and various other software operating on the client device (e.g., an operating system, etc.) may cooperate and communicate via a software communication mechanism implemented in association with the bus 206. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network, and radio transceivers for and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100 using various standard network communication protocols While FIG. 2 illustrates two sensors—sensor A 214a and sensor N 214n—the description herein applies to a system with one or more sensors (referred to individually as sensor 214 and collectively as sensors 214). Additionally, while sensor A 214a and sensor N 214n are illustrated as being communicatively coupled to the bus 206, the sensors 214 may be separate devices that communicatively couple to the client device 106 via the communications unit 208 (e.g. via USB, Bluetooth, etc.). Examples of sensors include, but are not limited to an ECG, PPG, HRV, breath position sensor, thermocouples, thermistors, sensors for resistance, potential, impedance, and admittance, electro myocardiograph, oscillometer, sphygmomanometer, camera, EEG, PET, fMRI, skin temperature sensor, electrodermal activity sensor, etc.

Output device 210 may be any device capable of outputting information. The output device 210 may include one or more of a display (LCD, OLED, etc.), a printer, a haptic device, an audio reproduction device, a touch-screen display, a remote computing device, etc. In some implementations, the output device is a display which may display electronic images and data output by a processor 202 for presentation to a user. In some implementations, the output device is a VR headset with a stereoscopic display which may display binocular electronic images and data output by a processor 202 for presentation to a user.

The input device 212 receives inputs generated by a user interacting with a game. Examples of input devices include, but are not limited to a keyboard, a mouse, a touchscreen, etc. In one embodiment, the input device 212 includes one or more game controls. Game events in many computer games are influenced, if not determined, by game controls under conscious control of the game's user. Common types of game controls include buttons, joysticks, turnable knobs and wheels, motion-detectors in the form of accelerometers and gyrometers, and cameras capturing images of the user coupled with logic to analyze the images. Housings comprising one or more game controls may sometimes be referred to as controllers, game controllers or game consoles.

Figure 3:
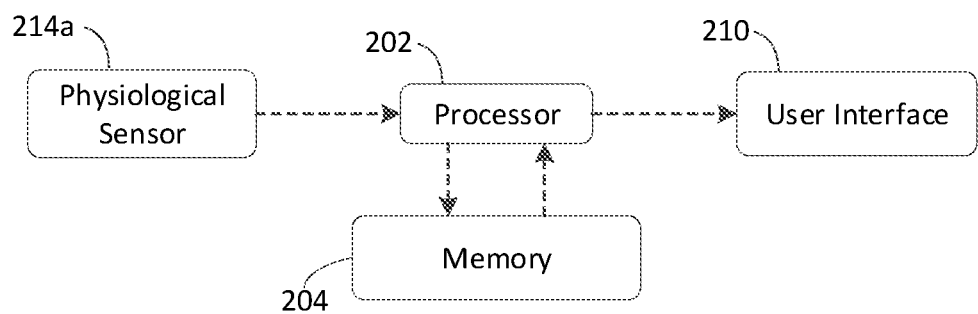
FIG. 3 presents a schematic diagram illustrating an example system in which physiological readings influence computer games, according to certain embodiments of the present disclosure.

FIG. 3 presents a schematic diagram illustrating a system 300 for physiological influence of computer games, according to certain embodiments of the present disclosure. The system 300 comprises a processor 202 communicatively coupled to a memory 204. The dashed line connecting the two components indicates that they are communicatively coupled; information may be transferred from one to the other, but does not necessarily require a physical connection. The processor 202 may execute instructions stored on the memory 204. The processor 202 may store and retrieve data, such as recorded time stamps and associated physiological readings and game events, from the memory 204 and process the data to determine a subsequent game event. The processor 202 and memory 204 may be the only components of the system 300. In addition, the system 300 may, optionally, comprise one or more user interfaces presented via an output device 210) to which the processor 202 may communicate one or more game events. The system 300 may, optionally, comprise one or more physiological sensors 214 that are communicatively coupled to the one or more processors 202. The processor 202 receives readings from the physiological sensor 214a and associates time stamps with the readings. The processor 202 executes instructions from the memory 204 causing the processor 202 to present a first game event on the user interface. The processor 202 associates the first game event with one or more time stamps sharing a common time standard with the time stamps associated with the readings. Using readings from a physiological sensor 214a (each of the readings associated with a time stamp corresponding to a time occurring during or after the one or more time stamps associated with the first game event), the processor 202 determines a subsequent game event and presents the subsequent game event on the user interface 210.

Some embodiments of the present disclosure use what has commonly become known as virtual reality (VR). VR typically refers to games and other electronic content presented on an output device 210 fastened to the face of the user. The display 210 in combination with a fastening means may be referred to as VR goggles. VR goggles typically comprise one or more gyros (sensors that measure angular acceleration). The gyros generate outputs indicative of the orientation of the user's head. VR goggles may also comprise one or more accelerometers measuring linear acceleration. As the orientation of the user's head changes, processing adjusts the image to generate a stereoscopic view on the output device 210 accordingly to create the illusion that the user is viewing a three-dimensional environment comprising three-dimensional objects. For this reason, VR games may provide a particularly immersive experience, making VR game events particularly effective at evoking physiological responses.

Figure 4:
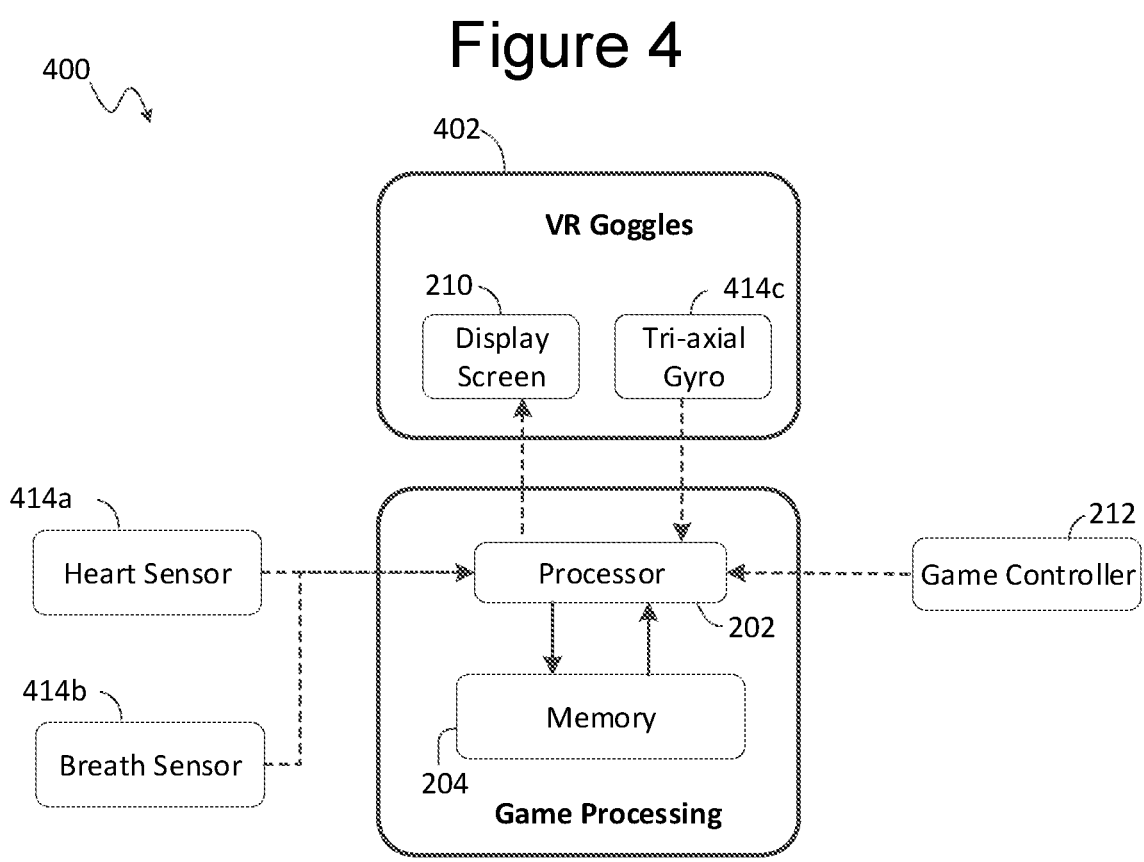
FIG. 4 presents a schematic diagram illustrating an example system comprising a virtual reality user interface and game controls in which physiological readings influence computer games, according to certain embodiments of the present disclosure.

FIG. 4 presents a schematic diagram illustrating an example system 400 comprising a VR user interface and game controller as an input device 212 in which physiological readings influence computer games, according to certain embodiments of the present disclosure. The system 400 comprises a processor 202 communicatively coupled to a memory 204. The processor 202 may execute instructions stored on the memory 204. The processor 202 may store and retrieve data, such as recorded time stamps and associated physiological readings and game events, from the memory 204 and process the data to determine a subsequent game event. In this embodiment, the system comprises VR goggles 402 which serve as a user interface. The VR goggles 402 comprise a display screen as an output device 210 and a tri-axial gyrometer 414c, each of which is communicatively coupled to the processor 202. The processor 202 receives readings from a heart sensor 414a and a breath sensor 414b and receives outputs from a game controller. The processor 202 associates time stamps with the readings and outputs. The processor 202 executes instructions from the memory 204 causing the processor 202 to present a first game event on the display screen. The processor 202 associates the first game event with one or more time stamps. Using readings from the heart sensor 414a and breath sensor 414b and outputs from the game controller (each of the readings and outputs associated with a time stamp occurring during or after the one or more time stamps associated with the first game event), the processor 202 determines a subsequent game event and presents the subsequent game event on the display screen. The processor 202 adjusts the presentation of the subsequent game event based on outputs from the tri-axial gyrometer 414c so that the images align with the orientation of the user's head.

Processing and data storage need not happen in close proximity to the physiological sensors or user interface and need not happen in close proximity to one another. In some embodiments, one or more processors determining game events may send information to a remote user interface over networks such as the Internet. Similarly, readings from physiological sensors may be transmitted to one or more remote processors over a network such as the Internet. Such embodiments may be useful if, for example, the game is being offered as SaaS (software as a service). Similarly, when a separate time-keeping means is employed, that time-keeping means may be located remotely from the other elements of the system.

Figure 5:
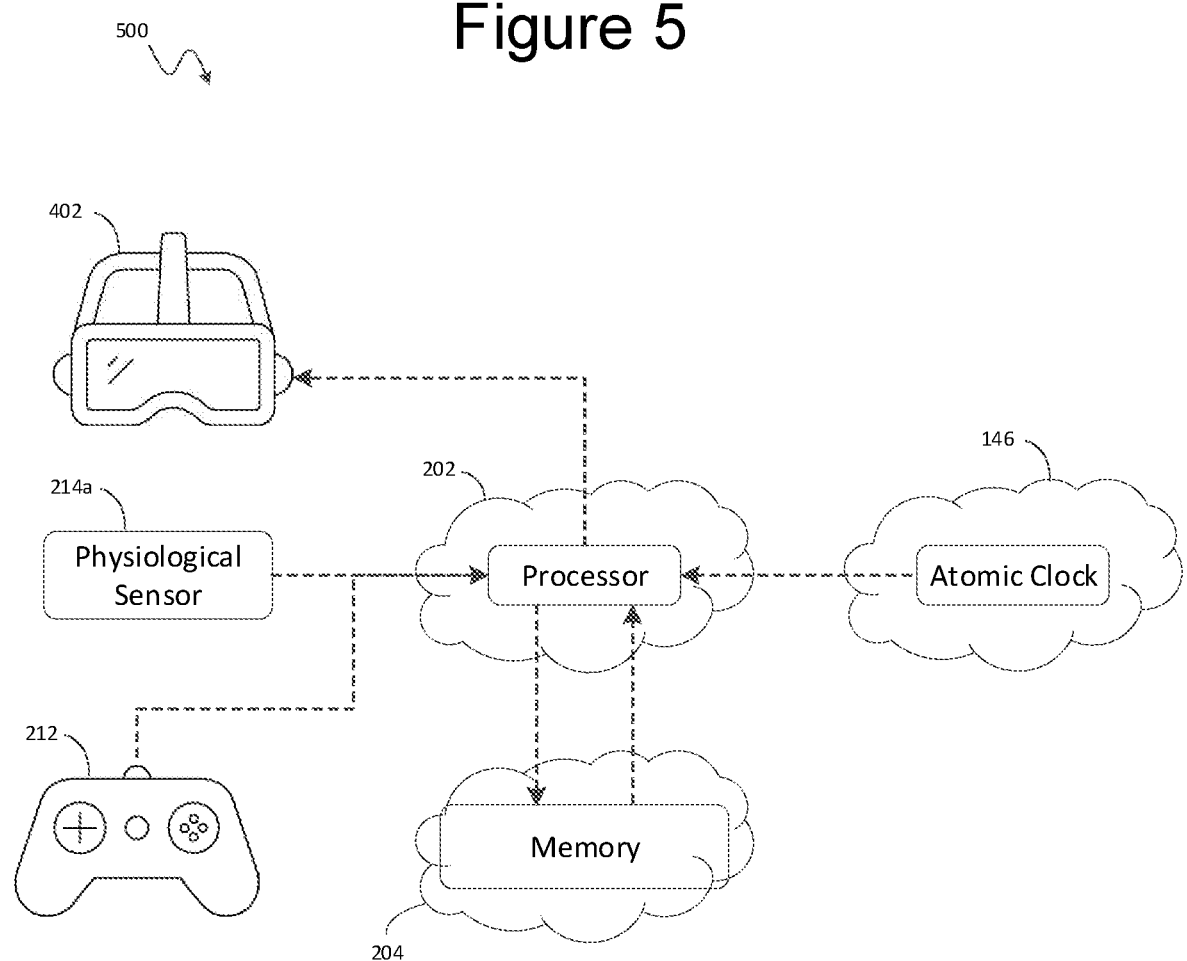
FIG. 5 presents a schematic diagram illustrating an example system in which physiological readings influence computer games and processing takes place remotely from physiological sensors and a user interface, according to certain embodiments of the present disclosure.

FIG. 5 presents a schematic diagram illustrating a system 500 in which physiological readings influence computer games and processing take place remotely from physiological sensors and a user interface, according to certain embodiments of the present disclosure. The system 500 comprises a processor 202 communicatively coupled to a memory 204. The cloud symbol surrounding the processor 202, memory 204, and atomic clock 146 signify that each element is communicatively coupled to the other elements through a network 102, such as the Internet, and need not be in a particular geographic location. The processor 202 may execute instructions stored on the memory 204. The processor 202 may store and retrieve data, such as recorded time stamps and associated physiological readings and game events, from the memory 204 and process the data to determine a subsequent game event. In this embodiment, the system comprises VR goggles 402 which serve as a user interface. The processor 202 receives readings from a physiological sensor 214a and from a game controller 212 and associates time stamps with the readings and outputs. The processor 202 executes instructions from the memory 204 causing the processor 202 to present a first game event on the VR goggles 402. The processor associates the first game event with one or more time stamps. Using readings from the physiological sensor 214a and outputs from the game controller 212 (each of the readings and outputs associated with a time stamp occurring during or after the one or more time stamps associated with the first game event), the processor 202 determines a subsequent game event and presents the subsequent game event on the VR goggles 402.

Figure 6:
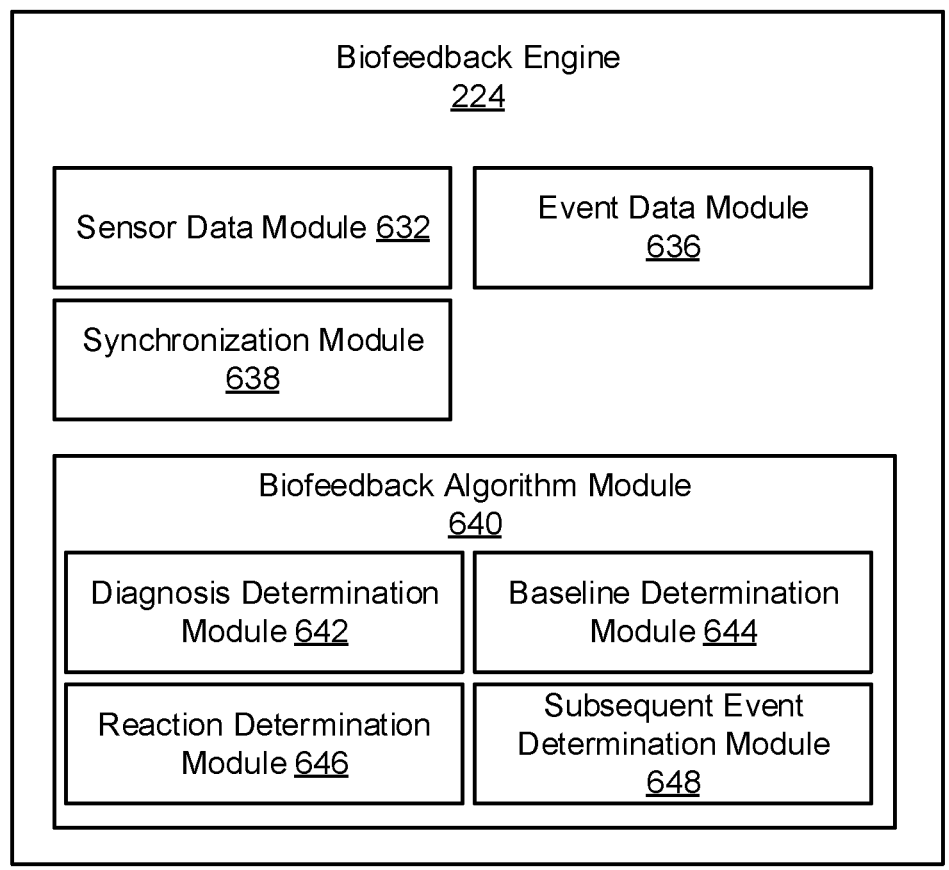
FIG. 6 is a block diagram illustrating an example biofeedback engine according to one embodiment.

Referring to FIG. 6, the biofeedback engine 224 is shown in more detail according to one embodiment. The biofeedback engine 224 may include code and routines for providing the functionality described herein. For example, the biofeedback engine 224 receives sensor input and game events and modifies subsequent game events.

Sensor data module 632 includes code and routines for receiving sensor data generated by one or more sensors. Examples of physiological sensors 214 include, but are not limited to an ECG, PPG, HRV, breath position sensor, thermocouples, thermistors, sensors for resistance, potential, impedance, and admittance, electro myocardiograph, oscillometer, sphygmomanometer, camera, EEG, PET, fMRI, etc.

Readings from the sensors may be received by the sensor data module 632 as unprocessed ("raw") or outputs that are derived measures meaningful in a physiological context. For example, a raw reading may simply be an electrical property such as current, voltage, or resistance at a particular time.

The physiological significance of a raw reading may be obtained by knowledge of the type and placement of the sensor that generated it. For example, an increase in voltage may be indicative of a heart contraction if the sensor is an ECG electrode placed over the heart.

Alternatively, some sensors may preprocess raw readings and provide derived readings to the sensor data module 632. For example, an ECG sensor may analyze the voltage output of the ECG electrode and generate readings corresponding to times at which a heart contraction has occurred. Readings resulting from further derivation may also qualify as readings. For example, an ECG sensor may deliver a reading corresponding to heart rate variability (HRV) that is the result of processing times at which multiple heart contractions occurred.

Some sensor readings may be a fixed frequency time series. For example, sensor data points received at some frequency. An ECG signal is a time series of voltages sampled 500 to 2000 times a second, while a PPG sensor may estimate heartrate every 5 seconds. In one embodiment, fixed-frequency data is collected without timestamps; if data is missing, "zero" values are stored in order to preserve an intact time series. Some readings may occur at unpredictable or irregular intervals (e.g. responsive to a physical event). In one embodiment, such readings are associated with a time stamp.

The event data module 636 includes code and routines for receiving event data. In one embodiment, the event data module 636 receives an event data generated from a user interacting with game logic 222. The event data may vary in structure and the information included therein depending on the embodiment. In one embodiment, the event data includes data points in an array. For example, the event data module 636 receives a JSON array. In one embodiment, an event datum includes a time, a type, and data. For example, in one embodiment, the event data module 636 receives event data points in a JSON array, where each data point is represented as a JSON object with fields for time, event type, and expected fields associated with the event type.

The time field represents a timing of an event. In some embodiments, the time is a time stamp. For example, in one embodiment, the time is a number of milliseconds since a start time.

The event type describes the type of event that has occurred during game play. In one embodiment, the event type is a human readable string. Examples of event types include, but are not limited to, control down, control up, control selected, item grabbed, item ungrabbed, item stored, item dropped, item placed, item removed, item activated, item deactivated, entity state change, start play, end play, pause play, restart play, start level, end level, start activity, progress activity, end activity, activity state change, score assessed, prize awarded, biofeedback level change, custom, etc.

The expected fields may vary depending on the event type. Examples include, but are not limited to an object (e.g. the name of a control, the name of an item, name of an entity, the name of a prize), a subject (e.g. the entity activating or deactivating a control, the entity making the selection, the entity grabbing, ungrabbing, storing, dropping, placing, removing, activating, or deactivating the item, the entity changing the state, the entity that received the prize, etc.), a location (e.g. name of a storage or placement location), a qualifier (e.g. describing usage of item activated or deactivated, describing the way the activity is progressing, the score value assessed, value the biofeedback level has been changed to), a transition (e.g. a before transition describing a state being left and an a after transition describing a state being entered as part of the state change), a name (e.g. describing a type of play that started or ended, the name of a level that has begun or ended, the name of the activity that has begun, is progressing or has ended, the score type being assessed, the biofeedback level being changed, etc.), a percent (e.g. how far an activity has progressed), a stage (e.g. the number of the stage to which the activity is progressing), and a number of stages.

In some embodiments, an event may be based on an interaction with the game logic 222 and the game logic therein. For example, completing a level, interacting with an item, etc. In some embodiments, an event may be based on a physiological response. For example, an event occurs when the user's heart rate raises by predefined amount or exceeds a threshold.

The synchronization module 638 includes code and routines for synchronizing event data and sensor data. In one embodiment, synchronizing event data and sensor data includes generating time stamps. Time stamps may be generated using one or more time-keeping devices. When more than one time-keeping device is used, each of the time-keeping devices may share a common time standard. Time stamps may be generated using a variety of time-keeping means. Because processors typically perform calculations on a regular time cycle, some embodiments may count processor cycles as a means for measuring time (and thereby generating time stamps). When the physiological sensor generates readings at regular time intervals, some embodiments may count the number of sensor readings to measure the passage of time. Alternatively, a separate time-measuring device may be used to generate time stamps. Examples of alternative time measuring devices include electric clocks such as quartz clocks, motor-driven clocks, synchronous clocks, and radio-controlled clocks that are wirelessly synchronized with a time standard such as an atomic clock 146, or an atomic clock 146 itself. In some embodiments, the synchronization module 638 calculates an offset and applies the offset to one or more of the sensor data and the event data. For example, in one embodiment, the synchronization module 638 calculates and applies a first offset to event data from a VR headset, where the first offset accounts for a difference between the VR headset's clock and an atomic clock, and calculates and applies a second offset to sensor data from a first sensor, where the second offset accounts for a difference between the clock of the first sensor and an atomic clock.

Based on the time stamps, the synchronization module 638 associates event data with sensor data, thereby associating physiological readings of a user with game events. In one embodiment, the synchronization module 638 associates event data with sensor data based on the time stamps using a common time standard. Association with a time stamp need not be a physical or spatial association. Data corresponding to a game event, physiological reading, or game control output need only be recorded in such a way that it is associated with a particular time. That association may take the form of, for example, an address in memory or physical location on a disk.

The biofeedback algorithm module 640 includes code and routines for determining a subsequent event based on a physiological result to a game event. In one embodiment, the biofeedback algorithm may access and apply one or more biofeedback algorithms (not shown) or there may be multiple biofeedback algorithm modules 640 each associated with a different algorithm or set of algorithms (not shown).

The one or more biofeedback algorithms may include different versions of a biofeedback algorithm and/or biofeedback algorithms having different roles/uses (e.g. to induce a certain physiological response associated with fear or excitement, to set a parameter associated with game speed, etc.). In one embodiment, the biofeedback algorithm applied by the biofeedback algorithm module 640 may obtain from a subscription, e.g., pulled from a subscription database or provided in a request by the game logic 222.

In some embodiments, the biofeedback algorithm module 640 applies the algorithm to perform real-time analysis. Real-time data analysis may be useful for series of game events designed to elicit particular physiological responses. Real-time data analysis may also be useful when determining a subsequent action determines a visual aspect with regard to that event as the analysis may need to run at the game's framerate for that visual aspect to be modified in a timely manner. However, in some embodiments, the biofeedback algorithm module 640 applies an algorithm to perform post-hoc analysis, as data sets including notation of game events and physiological readings, each associated with time stamps sharing a common time standard, may be useful for determining patterns in stimuli and physiological responses on a post-hoc basis. The algorithm or output of post-hoc analysis may vary based on the embodiment or use case. However, examples of post-hoc analysis and output include, by way of example and not limitation, an a better understanding of physiological responses at a group or population level, which may be fed back into the system by tuning a set of parameters for future users, and a better understanding of physiological responses of a specific user, which may be fed back into the system by tuning a set of parameters for the specific user's subsequent game sessions.

In some embodiments, such as those where the game is intended to be therapeutic, the biofeedback algorithm module 640 may include a diagnosis determination module 642. Diagnosis determination module 642 includes code and routines for determining a diagnosis. The diagnosis determined by the diagnosis determination module 642 may be used by the subsequent event determination module 648 for presenting a subsequent event.

For example, when the diagnosis determination module 642 determines that the user has insomnia; in one embodiment, the subsequent event determination module 648 may determine that it is after dark and the blue of a display be turned down at so as to minimize the effect of the artificial light on the user's sleep hormones or cycle. In another example, when the diagnosis determination module 642 determines that the user has a heart condition; in one embodiment, the subsequent event determination module 648 may adjust an intensity of a game event. For example, assume the game includes a starting event, such as someone screaming and lunging from a darkened door way, in one embodiment, the subsequent event determination module 648 may lighten the shadows in the doorway so that a light outline of that individual may be seen and reduces the volume of the scream so as to reduce cardiac shock from a startling game event. In yet another example, the diagnosis determination module 642 determines a user's limited range of motion based on sensor data and adjusts gameplay (i.e. one or more subsequent events) based on that limited range of motion. For example, a game intended for entertainment may be adjusted to work within the user's limited range of motion, and a therapeutic game may be adjusted to push or slightly exceed the limits of the user's range of motion in a manner that over time will expand the user's range of motion. In yet another example, when the diagnosis determination module 642 determines that the user has a phobia; in one embodiment, the subsequent event determination module 648 may adjust game play to use that phobia to confront and treat the phobia through exposure in a therapeutic manner or to exploit the fear if the game is intended to be terrifying.

In some embodiments, the diagnosis determination module 642 may determine the diagnosis by obtaining an explicit diagnosis. For example, in one embodiment, the diagnosis determination module 642 may receive a diagnosis from the user's (anonymized in some embodiments) EMR. In some embodiments, the diagnosis determination module 642 may determine a diagnosis implicitly. For example, the diagnosis determination module 642 may determine insomnia based on a pattern of the game being played late at night, or carpel tunnel based on an extent of use, etc. The foregoing are merely examples of implicit diagnoses. In some embodiments, the diagnosis determination module 642 may apply machine learning (e.g. supervised, semi-supervised, or unsupervised) to data sources 120 in order to determine a diagnosis. As stated above, the data sources 120 may include various types of data (e.g. medical, insurance, financial, personal, etc.) from which a variety of physiological, epidemiological, cognitive, behavioral, etc. diagnosis may be inferred by applying machine learning.

A physiological response to a game event may be determined according to an absolute scale. For example, if an ECG sensor indicates that heart rate exceeds 120 beats per minute (BPM) after a first game event, some embodiments may determine a subsequent game event with lower stimulus intensity than the first game event. However, such a criterion is not optimal because it does not consider the change in a physiological measure from before the first game event to after the first game event. If the game user's heart rate was 120 BPM both before and after the first game event, no physiological response could be attributed to the first game event. Accordingly, some embodiments include a baseline determination module 644. The baseline determination module 644 includes code and routines for determining a baseline. For example, the baseline determination module 644 determines that a heart rate of 120 BPM as the baseline heart rate.

The reaction determination module 646 includes code and routines for determining how the user 112 reacted to a game event. In one embodiment, how the user 112 reacted to the game event is based on the physiological response represented by the sensor data or change in sensor data.

Processing of physiological readings generated during or after the first game event may yield some measure of a physiological response to the first game event. However, those with knowledge of the art will understand that useful determination of the subsequent game event need not require a specific physiological parameter. For example, in embodiments using ECG readings, processing need not determine a specific measure of beats-per-minute (BPM) in the selection of a subsequent game event. A calculation without particular physiological meaning, for example a sum of raw ECG electrical outputs over a time period, could serve as a proxy for heart rate. Any number of methods of processing readings from physiological sensors could be used to select a subsequent game event without determining a physiological measure, per se.

In some embodiments, the utility of the method may comprise determination of a physiological response to a game event irrespective of whether the measured physiological response is, in turn, used to determine a subsequent game event. For example, determining an increase in heart rate in response to a game event simulating combat could be used in establishing a diagnosis of combat-related post-traumatic stress disorder (PTSD). Establishing a physiological response to a game event may be useful even if not used in diagnosis or treatment of a medical or behavioral condition. For example, researchers may wish to quantify the degree of physiological response to a particular set of stimuli in order to determine the amount of variation in mental sensitivity to particular conditions. For example, researchers may wish to establish the variation in physiological response to a game event simulating danger or social awkwardness. The methods described herein for determining a subsequent game event may be applied to determination of a physiological response to a game event irrespective of whether the determined physiological response is used to determine a subsequent game event.

In some embodiments the reaction may be based on the determined baseline. For example, in some embodiments, the system determines the subsequent game event using readings associated with time stamps indicating times occurring before the first game event (i.e. a baseline) and readings associated with time stamps indicating times occurring after the first game event (i.e. a reaction). For example, when the reaction determination module 646 determines based on ECG sensor data indicating that heart rate increased by at least 50 beats per minute from before the first game event to after the first game event, some embodiments may determine that the subsequent game event have lower stimulus intensity than the first game event.

Determining a physiological response after a single presentation of a game event provides only a single observation for determining the user's response to the game event and raises the possibility that the physiological response was not caused by the game event, but by some other confounding factor. Therefore, in some embodiments, the reaction determination module 646 may determine a reaction by comparing physiological readings (from the one or more sensors 214) generated after each of multiple presentations of a single game event, and the subsequent event determination module 648 based on that comparison. Such embodiments may better determine the physiological effect of the game event without confounding factors such as, for example, the novelty of experiencing the game event for the first time. In these embodiments, the game event may be identical or functionally identical on each presentation. In some embodiments, the subsequent event determination module 650 may determine the subsequent game event based on an analysis by the reaction determination module 646 using readings generated after the first and second presentations of the game event. For example, some embodiments may compare an average of readings generated after a first presentation of the game event with an average of readings generated after a second presentation of the game event. Comparison metrics could take many forms including, for example, a difference between the averages or a ratio of the averages. Determination of the subsequent game event could comprise, for example, determining whether the comparison metric was greater or less than a threshold.

The subsequent event determination module 650 determines a subsequent event based on a user's physiological response to at least on event. The subsequent event determined may define a narrative of the game (e.g. presenting event 2a vs event 2b) and/or may modify a parameter that modifies the subsequent event, e.g., an intensity, a completion criterion, a threshold, etc.

After associating a first game event and physiological readings with respective time stamps, the one or more processors may determine a subsequent game event using readings with time stamps indicating times occurring during or after the first game event. The time range of the readings used to determine the subsequent game event may depend on the type of the first game event. For example, if the first game event is sudden (e.g. a loud noise), the response value may be determined from readings associated with time stamps occurring in a very short time interval following the game event. However, if the first game event is a gradual shift from daytime colors to nighttime colors, the readings used to determine the subsequent game event may be associated with time stamps occurring for a longer time period after the first game event. After determining the subsequent game event, the one or more processors may present the subsequent game event on the one or more user interfaces.

In some embodiments, the subsequent event determination module 650 determines a subsequent event determined to elicit a specified physiological response to the subsequent event. For example, in one embodiment, the subsequent event determination module 650 sets a completion criterion for a physical therapy related game event so that the patient (user) does not overdo it (e.g. set so that the patient is challenged or experiences a specified level of discomfort or exertion). Such an embodiment may beneficially reduce instances where a completion criterion is initially set too ambitiously and the user hurts himself/herself trying to achieve completion.

In some embodiments, the subsequent event determination module 650 determines a subsequent game event using physiological readings generated after each of a first game event and a second game event. Determining physiological responses to multiple game events may be advantageous in that doing so may allow the method to determine the effect of each of multiple parameters individually without potential interactive effects among the parameters that would occur if the multiple parameters were presented in the same game event. For example, some embodiments may determine a subsequent game event using readings associated with time-stamps indicating that they occurred after a first game event comprising bright lights without loud sounds and using readings associated with time stamps indicating that they occurred after a second game event comprising loud sounds but not bright lights. In particular embodiments, processing may determine the subsequent game event using readings generated after each of the first game event and the second game event, processing the readings after each of the game events to measure a physiological reaction to each of bright light and loud sounds.

In addition to physiological readings, some embodiments may use other types of inputs that influence determination of the subsequent game event. For example, some embodiments may use a diagnosis to modify a subsequent game event. In another example, some embodiments may use values corresponding to measurements of game events. Game event values could quantify a variety of attributes including, without limitation: sound volume, monitor brightness, average color hue, stimulus frequency, the number of stimuli present on a screen, the size of stimuli present on a screen, or any other metric. In some embodiments, processing determines a subsequent game event using four values: physiological readings generated during or after a first game event; a metric of the first game event; physiological readings generated during or after a second game event; and a metric of the second game event. Embodiments of this type may be used to identify relationships between quantifiable game event metrics and physiological response to the game events. A subsequent game event may then be chosen based on determination of the relationship. Depending on the embodiment and implementation, a subsequent event may be subsequent in one or more regards. For example, the subsequent event may be subsequent in time, which may include subsequent in the narrative of the game, subsequent in the same game session, in a subsequent game session of the same or different game. Regarding subsequent sessions of the same or a different game, assume that based on the sensor data, the biofeedback algorithm module 640 observes that resonant breathing is one activity observed to be most effective at 9 seconds per breath for a particular user, in one embodiment, the biofeedback algorithm module 640 may determine to provide content or input (i.e. subsequent events) at that frequency.

In some embodiments, the biofeedback algorithm module 640 uses machine learning to train the algorithm and determine the subsequent event. Some embodiments employ machine learning (ML) techniques to identify patterns in data comprising data elements corresponding to time-stamped game events and data elements corresponding to time-stamped physiological readings.

Variation in the types of games (e.g. entertainment, therapeutic), game events, diagnoses (e.g. both physical and cognitive), sensors, sensor data (e.g. describing the physiological response of a user and/event condition, such as game volume, etc.), based on embodiment and use case are so numerous as to defy a complete list. Similarly, the varieties of supervised, semi-supervised, and unsupervised machine learning algorithms are so numerous as to defy a complete list. Example types of ML include neural networks, Markov models, support vector machines, decision trees, random forests, and boosted stumps.

Some embodiments may use supervised machine learning techniques in which the one or more processors use training data to generate models that predict some of the variables (output variables) using other variables (input variables). The model fitted to the training data may subsequently be used to predict outcome variables when the outcome variables are not known or measured. In addition to data elements corresponding to game events and physiological readings, training data may, optionally, comprise input variables adding predictive value to the model or output variables that are of interest as outcomes. Optional input variables may comprise, for example, attributes of game events and time-stamped outputs from game controls. Optional output variables may include, for example, diagnoses of the user, treatments, and the response (if any) of the diagnoses to the treatments either individually or in combination. Optional output variables may also include categories that have further predictive value, for example categories or measures of cognitive traits of the user. The models generated using the training data may then be applied in circumstances in which the input variables are known but the output variables are not. Some embodiments may use unsupervised machine learning techniques in which the one or more processors identify patterns in data comprising time-stamped game events and time-stamped physiological readings.

In some embodiments, the machine learning is trained on data specific to the user being presented the subsequent event. For example, the subsequent event presented to user A is determined based exclusively on the physiological response of user A to one or more prior events. In some embodiments, the machine learning is trained on data, which may be anonymized, across multiple users. For example, using machine learning, the subsequent event determination module 650 determines a plurality of user classification, and based on user A's physiological response determines user A belongs to a first classification of user (e.g. expert) and determines a subsequent game event that is associated with that class of user.

Example Method Embodiments

Figure 7:
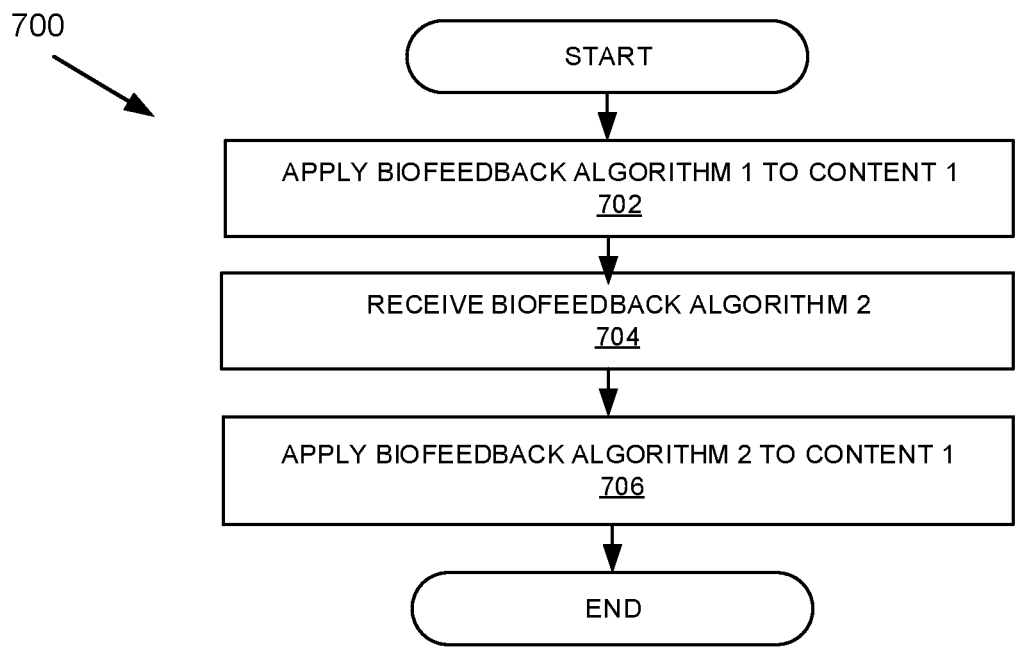
FIG. 7 presents a flowchart illustrating a method for decoupling of game logic development and biofeedback algorithm development, according to certain embodiments of the present disclosure.

FIG. 7 presents a flowchart illustrating a method 700 for decoupling of game logic development and biofeedback algorithm development, according to certain embodiments of the present disclosure. At block 702, the biofeedback algorithm module 640 applies a first biofeedback algorithm to game content (e.g. game event 1). At block 704, a second biofeedback algorithm is received. For example, an updated version of the biofeedback algorithm is received. At block 706, the second biofeedback algorithm, received at block 704, is applied to the game content (e.g. the first event) and the method 700 ends. Accordingly, in the illustrated method 700, the biofeedback algorithm development and usage is decoupled from the development of game content and events.

Figure 8:
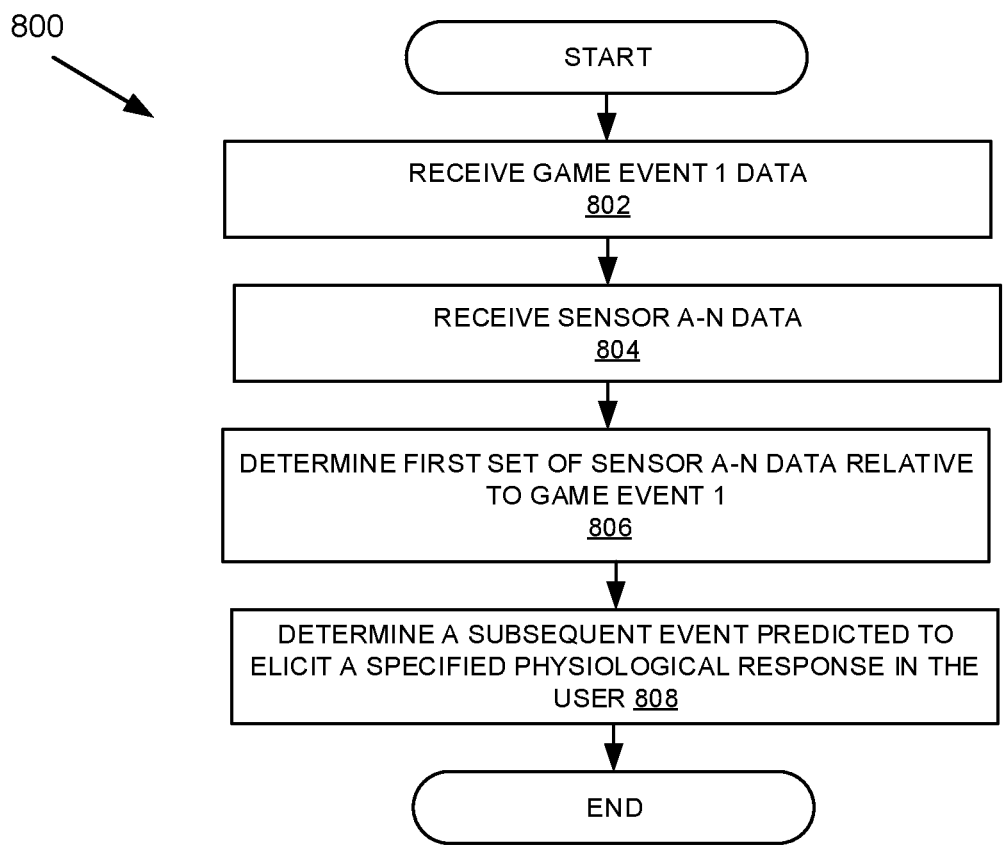
FIG. 8 presents a flowchart illustrating a method for eliciting a specified physiological response in a computer games, according to certain embodiments of the present disclosure.

FIG. 8 presents a flowchart illustrating a method 800 for eliciting a specified physiological response in a computer games, according to certain embodiments of the present disclosure. At block 802, the event data module 634 receives event data for event 1. At block 804, the sensor data module 632 receives sensor data from one or more sensors (i.e. sensors A-N). At block 806, the synchronization module 638, determines a first set of sensor A-N data relative to game event 1 (e.g. associated based on time stamps). At block 808, the subsequent event determination module 650 determines a subsequent event predicted to elicit a specified physiological response in the user (e.g. to increase the user's heart rate by X, or cause the user's breathing to increase) and the method 800 ends.

Figure 9:
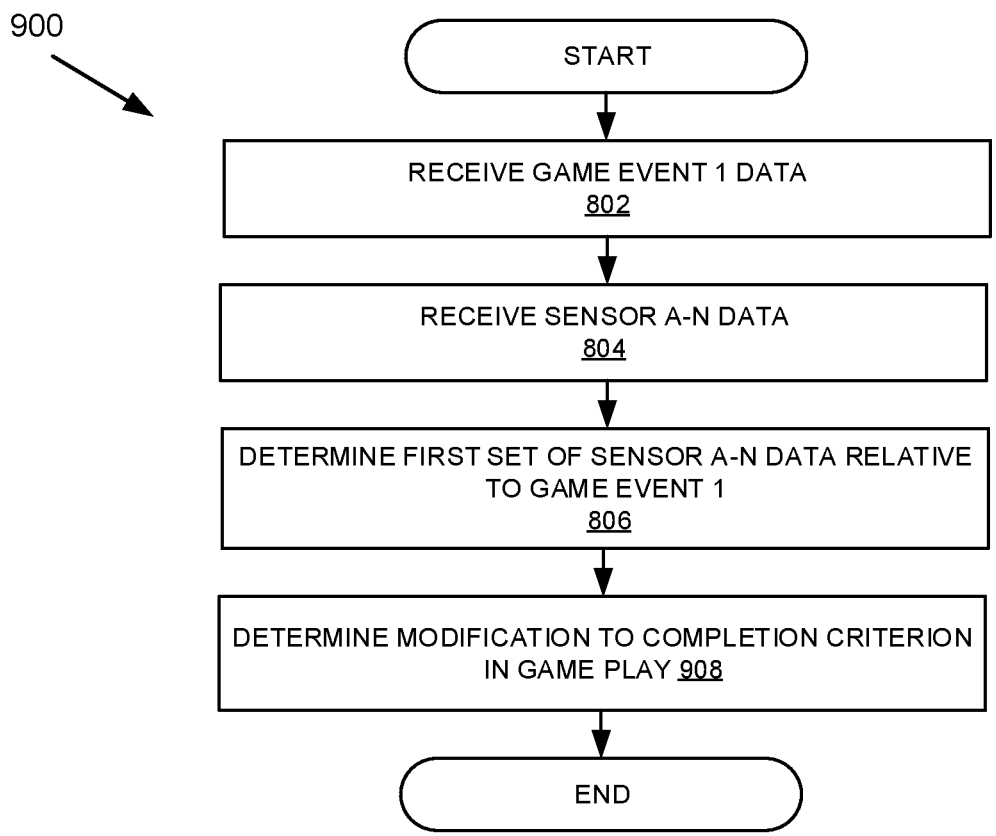
FIG. 9 presents a flowchart illustrating a method for modifying a completion criterion within a game based on physiological influence, according to certain embodiments of the present disclosure.

FIG. 9 presents a flowchart illustrating a method 900 for modifying a completion criterion within a game based on physiological influence, according to certain embodiments of the present disclosure. At block 802, the event data module 634 receives event data for event 1. At block 804, the sensor data module 632 receives sensor data from one or more sensors (i.e. sensors A-N). At block 806, the synchronization module 638, determines a first set of sensor A-N data relative to game event 1 (e.g. associated based on time stamps). At block 908, the subsequent event determination module 650 determines a subsequent event by modifying a completion criterion associated with the subsequent event and the method 900 ends.

Figure 10:
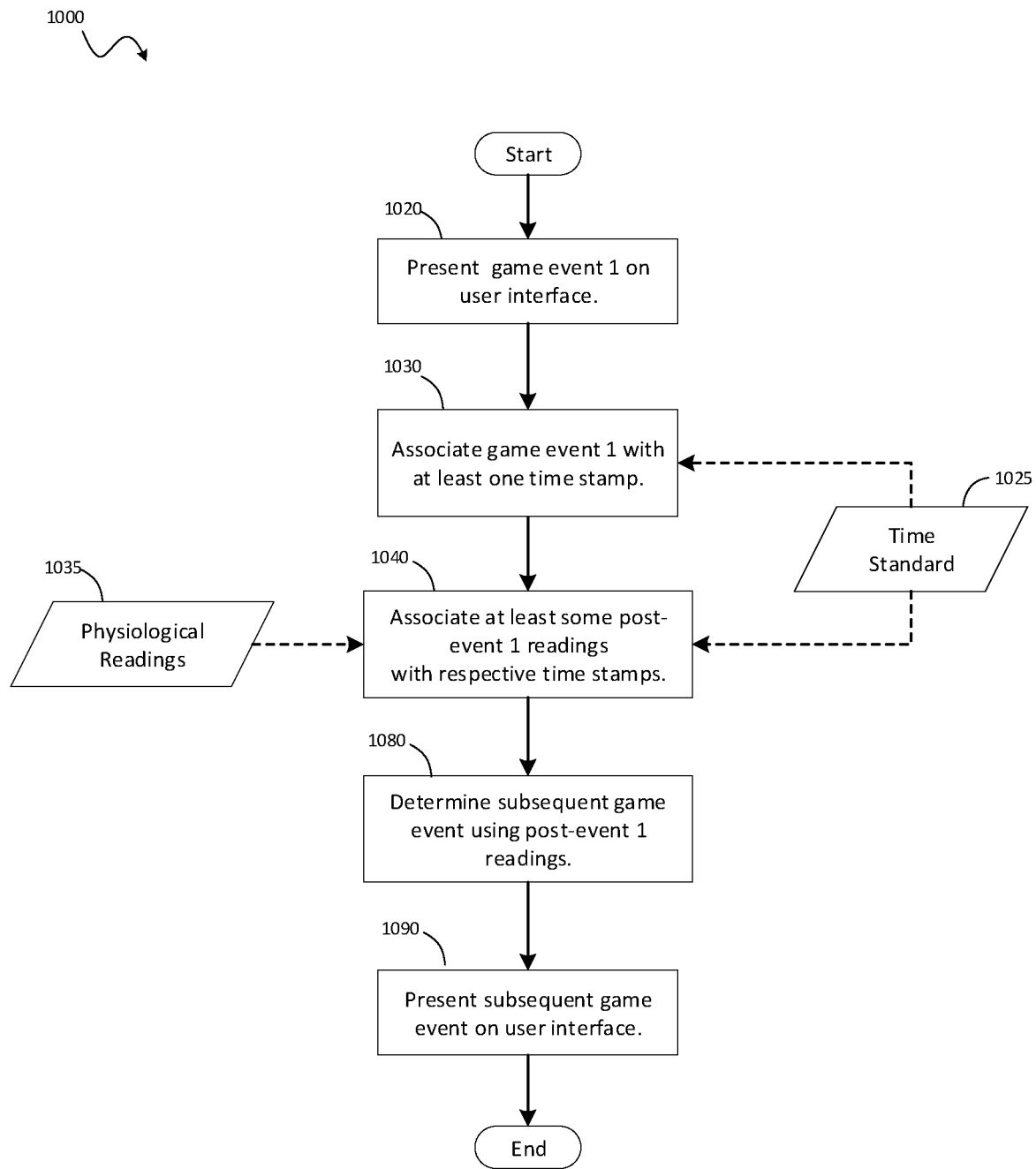
FIG. 10 presents a flowchart illustrating a method for physiological influence of computer games, according to certain embodiments of the present disclosure.

FIG. 10 presents a flowchart illustrating a method (1000) for physiological influence of computer games, according to certain embodiments of the present disclosure. At block 1020, one or more processors (collectively "processing") present a game event on one or more user interfaces. At block 1030, processing associates the game event with a first set of one or more time stamps indicating a time at which the game event was presented on the one or more user interfaces. At block 1025, the time stamps are generated by one or more time-keeping means that share a common time standard. At block 1045, processing associates at least some physiological readings (1035) with respective time stamps. The readings (1035) indicate at least one physiological measure of a user who can perceive the game event presented by the one or more user interfaces. The respective time stamps associated with the readings (1035) share the same time standard (1025) as that used for the one or more time stamps associated with the game event. At block 1080, processing determines a subsequent game event using a first set of one or more readings. At least one reading of the first set of one or more readings is associated with at least one time stamp corresponding to a time occurring during or after the first set of one or more time stamps (indicating that at least one of the readings was generated after the start of the first game event). At block 1090, processing then presents the subsequent game event on the one or more user interfaces and the method 1000 ends.

Figure 11:
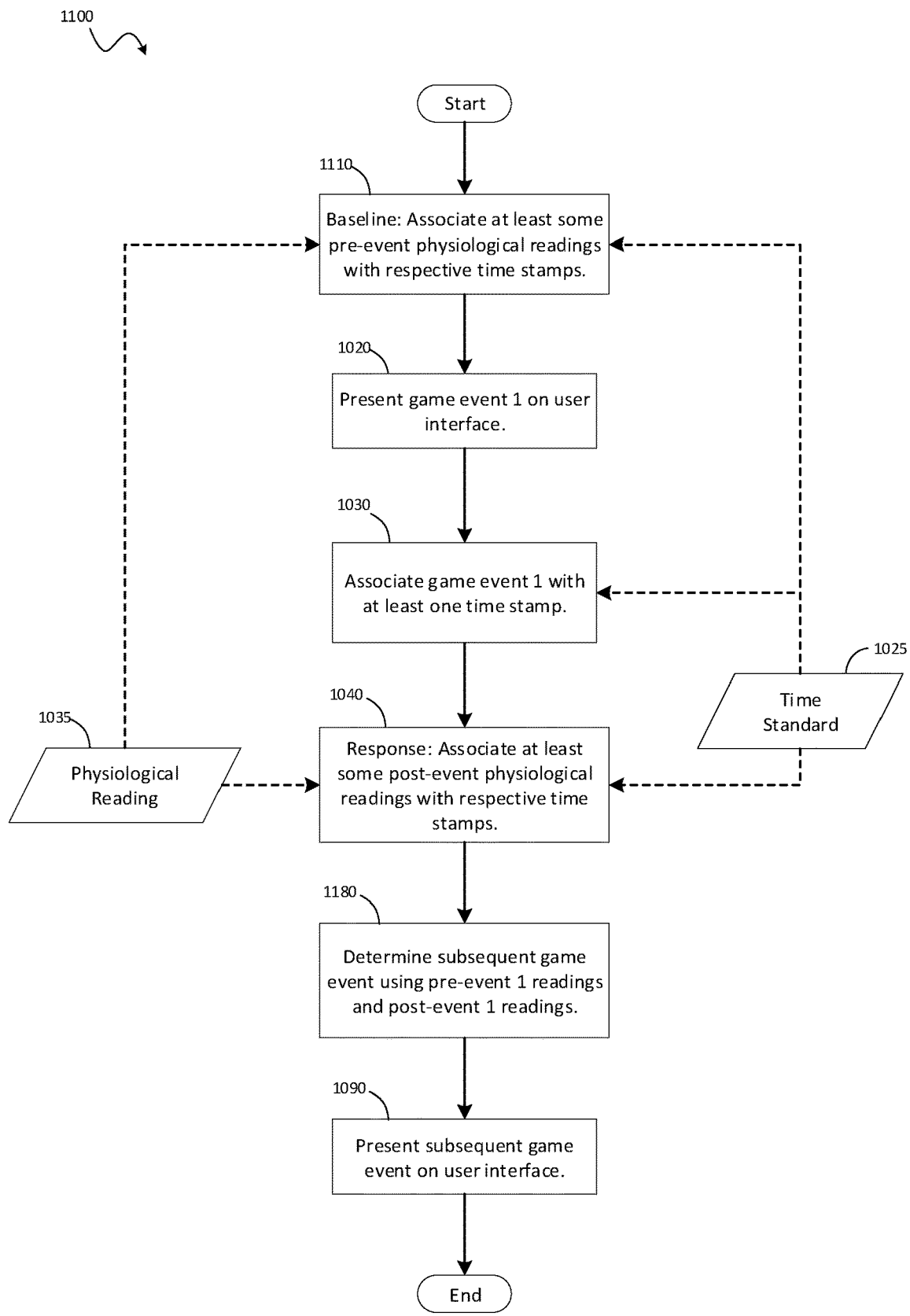
FIG. 11 presents a flowchart illustrating a method for physiological influence of computer games using baseline readings, according to certain embodiments of the present disclosure.

FIG. 11 presents a flowchart illustrating a method 1100 for physiological influence of computer games using baseline readings, according to certain embodiments of the present disclosure. At block 1020, one or more processors (collectively "processing") present a game event on one or more user interfaces. At block 1030, processing associates the game event with a first set of one or more time stamps indicating a time at which the game event was presented on the one or more user interfaces. At block 1025, the time stamps are generated by one or more time-keeping means that share a common time standard. At block 1045, processing associates at least some physiological readings (1035) with respective time stamps. The readings (1035) indicate at least one physiological measure of a user who can perceive the game event presented by the one or more user interfaces. The respective time stamps associated with the readings (1035) share the same time standard (1025) as that used for the one or more time stamps associated with the game event. At block 1180, processing determines a subsequent game event using a first set of one or more pre-event readings and a second set of one or more post-event readings, as determined by the time stamps associated with the readings and the game event. At block 1090, processing then presents the subsequent game event on the one or more user interfaces and the method 1100 ends.

Figure 12:
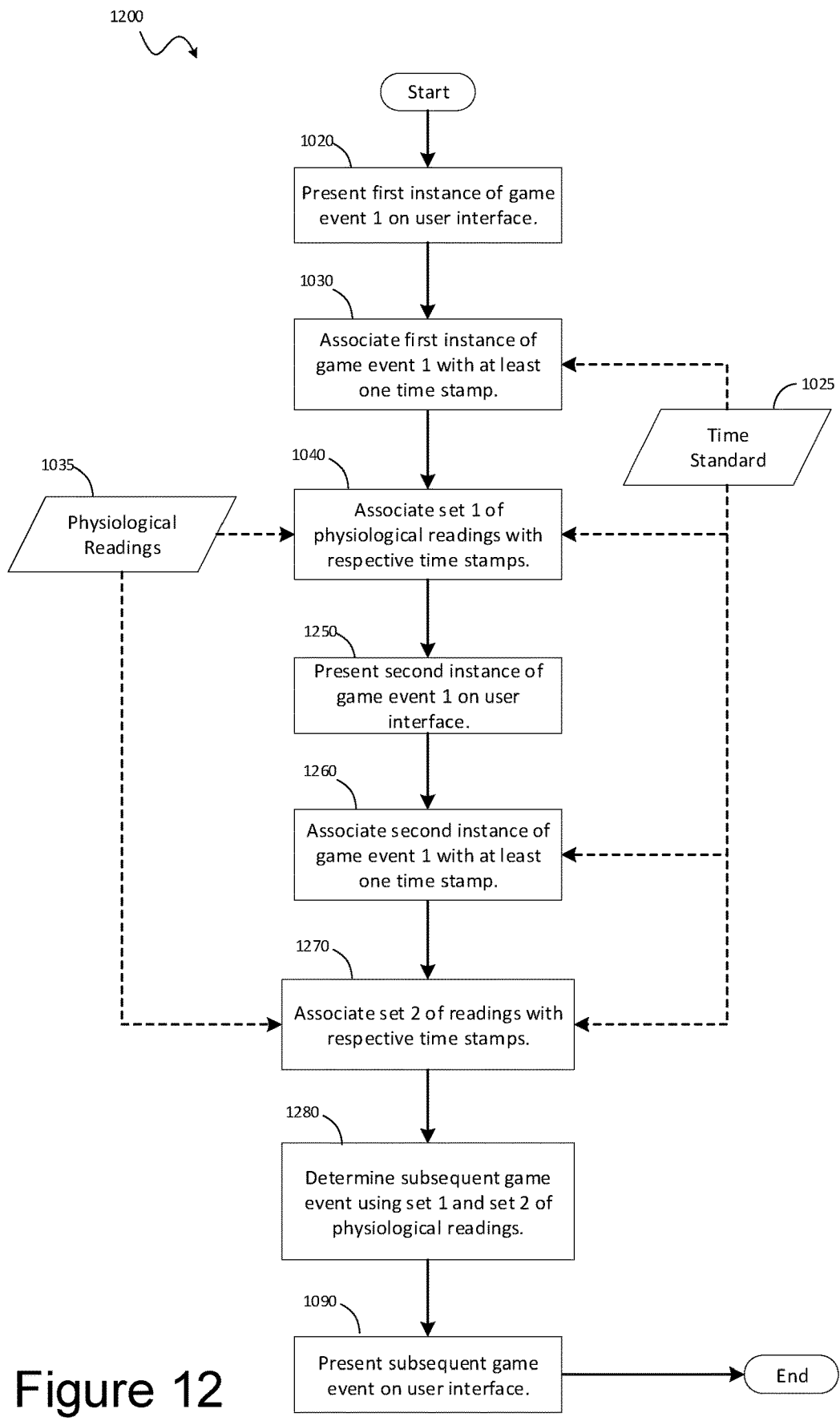
FIG. 12 presents a flowchart illustrating a method for physiological influence of computer games presenting multiple instances of a single game event, according to certain embodiments of the present disclosure.

FIG. 12 presents a flowchart illustrating a method 1200 for physiological influence of computer games presenting multiple instances of a game event, according to certain embodiments of the present disclosure. Depending on the implementation, the multiple instances may be repeated instances of identical game events (e.g. a repeat of the same content, such as the same enemy character jumping from the same darkened doorway) or multiple instances of equivalent game events (e.g. the first instance of an equivalent game event may be an enemy jumping from a darkened door way and a second instance of an equivalent game event may be a cat jumping from a box the use opens in game, which may be equivalent because they both are intended to induce a startle response in the user). At block 1020, one or more processors (collectively "processing") present a game event on one or more user interfaces. At block 1030, processing associates the game event with a first set of one or more time stamps indicating a time at which the game event was presented on the one or more user interfaces. At block 1025, the time stamps are generated by one or more time-keeping means that share a common time standard. At block 1045, processing associates at least some physiological readings (1035) with respective time stamps. The readings (1035) indicate at least one physiological measure of a user who can perceive the game event presented by the one or more user interfaces. The respective time stamps associated with the readings (1035) share the same time standard (1025) as that used for the one or more time stamps associated with the game event. At block 1250, processing then presents a second instance of the first game event on the one or more processors and, at block 1260, associates the second instance of the first game event with a second set of one or more time stamps. At block 1270, processing associates a second set of one or more physiological readings (1035) with respective time stamps. The first set of readings is associated with time stamps indicating times occurring after the first set of one or more time stamps (the first instance of the first game event) but before the second set of one or more time stamps (the second instance of the first game event). The second set of readings is associated with time stamps indicating times occurring after both the first set of one or more time stamps (the first instance of the first game event) and the second set of one or more time stamps (the second instance of the first game event). At block 1280, processing determines a subsequent game event using both the first set of one or more readings and the second set of one or more readings. At block 1290, processing then presents the subsequent game event on the one or more user interfaces and the method 1200 ends.

Figure 13:
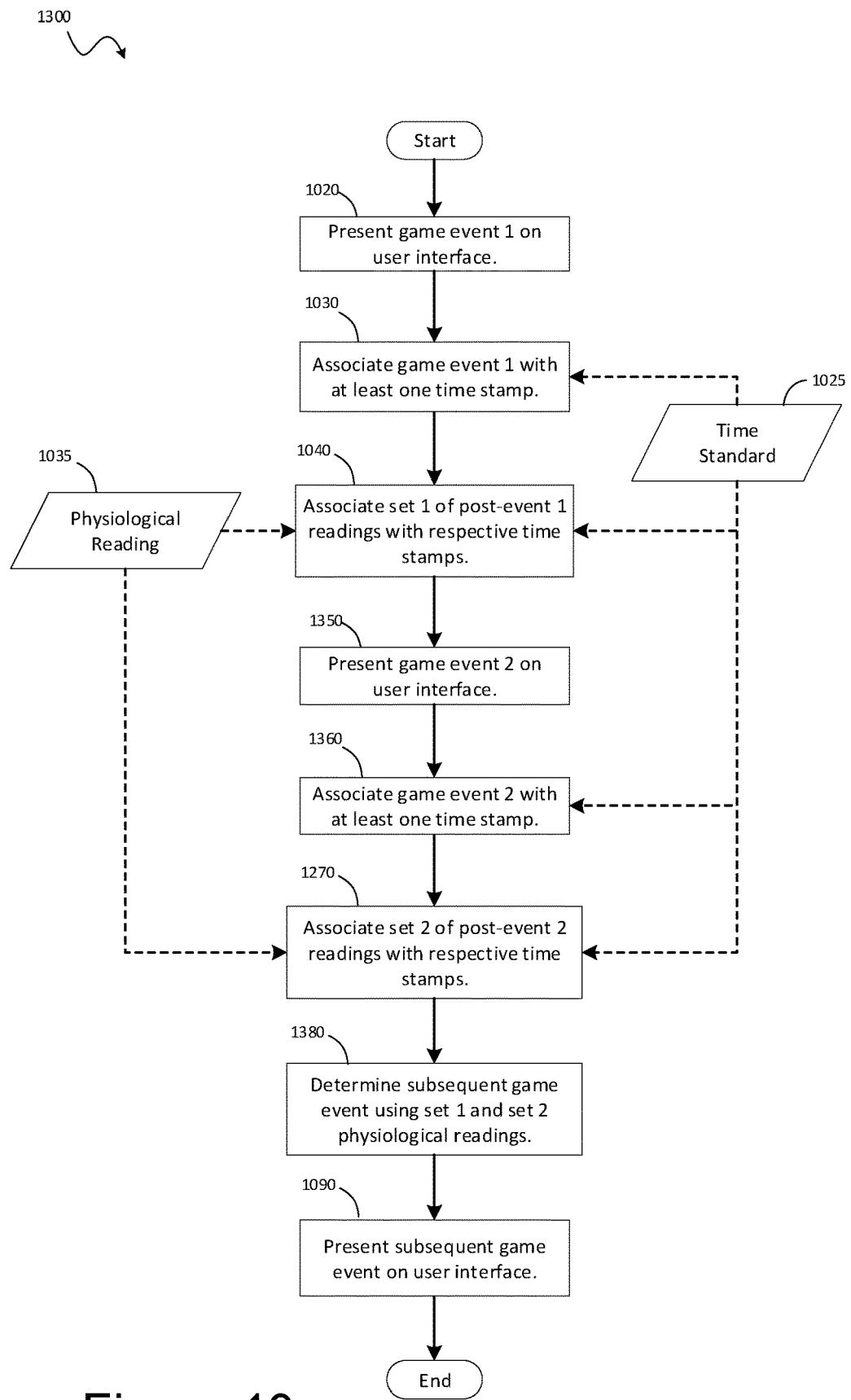
FIG. 13 presents a flowchart illustrating a method for physiological influence of computer games presenting two game events, according to certain embodiments of the present disclosure.

FIG. 13 presents a flowchart illustrating a method 1300 for physiological influence of computer games presenting two game events, according to certain embodiments of the present disclosure. At block 1020, one or more processors (collectively "processing") present a game event on one or more user interfaces. At block 1030, processing associates the game event with a first set of one or more time stamps indicating a time at which the game event was presented on the one or more user interfaces. At block 1025, the time stamps are generated by one or more time-keeping means that share a common time standard. At block 1045, processing associates at least some physiological readings (1035) with respective time stamps. The readings (1035) indicate at least one physiological measure of a user who can perceive the game event presented by the one or more user interfaces. The respective time stamps associated with the readings (1035) share the same time standard (1025) as that used for the one or more time stamps associated with the game event. At block 1350, processing then presents a second game event on the one or more user interfaces and, at block 1360, associates the second game event with a second set of one or more time stamps. At block 1270, processing associates a second set of one or more physiological readings (1035) with respective time stamps (1025). The first set of readings is associated with time stamps indicating times occurring after the first set of one or more time stamps (the first game event) but before the second set of one or more time stamps (the second game event). The second set of readings is associated with time stamps indicating times occurring after both the first set of one or more time stamps (the first game event) and the second set of one or more time stamps (the second game event). At block 1380, processing determines a subsequent game event using both the first set of one or more readings and the second set of one or more readings. At block 1090, processing then presents the subsequent game event on the one or more user interfaces and the method 1300 ends.

In some circumstances, it may be advantageous to compare the effect of a first stimulus alone to its effect in combination with a second stimulus. Some embodiments determine a subsequent game event using readings generated after each of multiple instances of a first game event in which some instances of the first game event are accompanied by a second game event overlapping in time a particular presentation of the first game event. Such embodiments may be advantageous to determine how two stimuli interact with each other. For example, if the first game event comprises a bright visual element and the second game event comprises a loud sound, some embodiments may compare physiological readings generated after the first game event alone with those generated after the first and second game events presented in combination. In this way, the additive effect of the loud sound on the bright visual element may be determined. Some embodiments may compare the physiological readings generated after each of the first and second game events presented alone with readings generated after the first and second game events presented overlapping in time.

There are multiple ways in which a first game event and a second game event may be presented in combination—that is, overlapping in time. If the first game event is an interval event and the second game event is an instantaneous game event, overlapping game events may occur when the second game event is presented after the first time stamp associated with the first game event but before the last time stamp associated with the first game event. Conversely, if the second game event is an interval event and the first game event is an instantaneous game event, overlapping game events may occur when the first game event is presented after the first time stamp associated with the second game event but before the last time stamp associated with the second game event. If both the first and second game event are each interval events, overlapping of the two events may occur when the first time stamp of either game event occurs after the first time stamp of the other game event and before the last time stamp of the other game event. When both the first and second game events are instantaneous game events, overlap may be defined in terms of a maximum time interval between the two game events. In order to achieve a perceived effect of the two instantaneous game events occurring together, the two game events need not be associated with identical time stamps. The two game events may functionally overlap if they occur within a maximum amount of time from one another, thus appearing to occur in the same time period of not the same instant. Similarly, time overlap when one or both of the game events is an interval event could also be defined in terms of a maximum amount of time between the two events. The start times, end times, or some function of either or both may be the basis for determining the time elapsed between the two game events.

Figure 14:
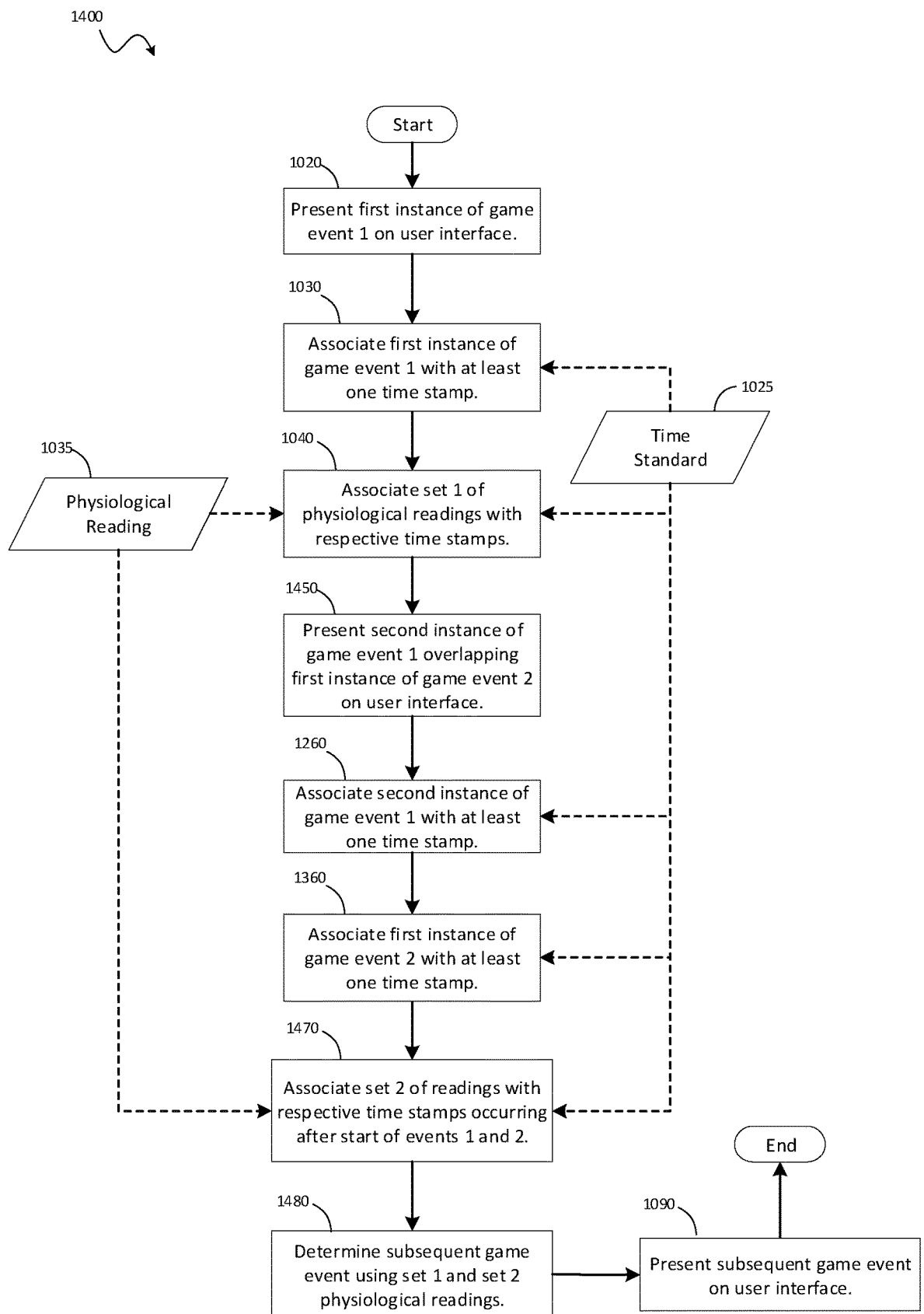
FIG. 14 presents a flowchart illustrating a method for physiological influence of computer games presenting two instances of a first game event, the second instance of the first game event overlapping with a second game event, according to certain embodiments of the present disclosure.

FIG. 14 presents a flowchart illustrating a method 1400 for physiological influence of computer games presenting two instances of a first game event, the second instance of the first game event overlapping with a second game event, according to certain embodiments of the present disclosure. At block 1020, one or more processors (collectively "processing") present a game event on one or more user interfaces. At block 1030, processing associates the game event with a first set of one or more time stamps indicating a time at which the game event was presented on the one or more user interfaces. At block 1025, the time stamps are generated by one or more time-keeping means that share a common time standard. At block 1045, processing associates at least some physiological readings (1035) with respective time stamps. The readings (1035) indicate at least one physiological measure of a user who can perceive the game event presented by the one or more user interfaces. The respective time stamps associated with the readings (1035) share the same time standard (1025) as that used for the one or more time stamps associated with the game event. At block 1450, processing then presents a second instance of the first game event overlapping a first instance of a second game event on the one or more processors. The first and second game events may temporally overlap on a variety of ways described above. At block 1260, processing associates the second instance of the first game event with a second set of one or more time stamps. At block 1360, processing associates the second game event with a third set of one or more time stamps. At block 1470, processing associates a second set of one or more physiological readings (1035) with respective time stamps (1025). The first set of readings is associated with time stamps indicating times occurring after the first set of one or more time stamps (the first instance of the first game event) but before the second and third sets of one or more time stamps (the second instance of the first game event and the second game event, respectively). The second set of readings is associated with time stamps indicating times occurring after both the first, second, and third sets of one or more time stamps (the first and second instances of the first game event and the second game event, respectively). At block 1480, processing determines a subsequent game event using both the first set of one or more readings and the second set of one or more readings. At block 1090, processing then presents the subsequent game event on the one or more user interfaces and the method 1400 ends.

Figure 15:
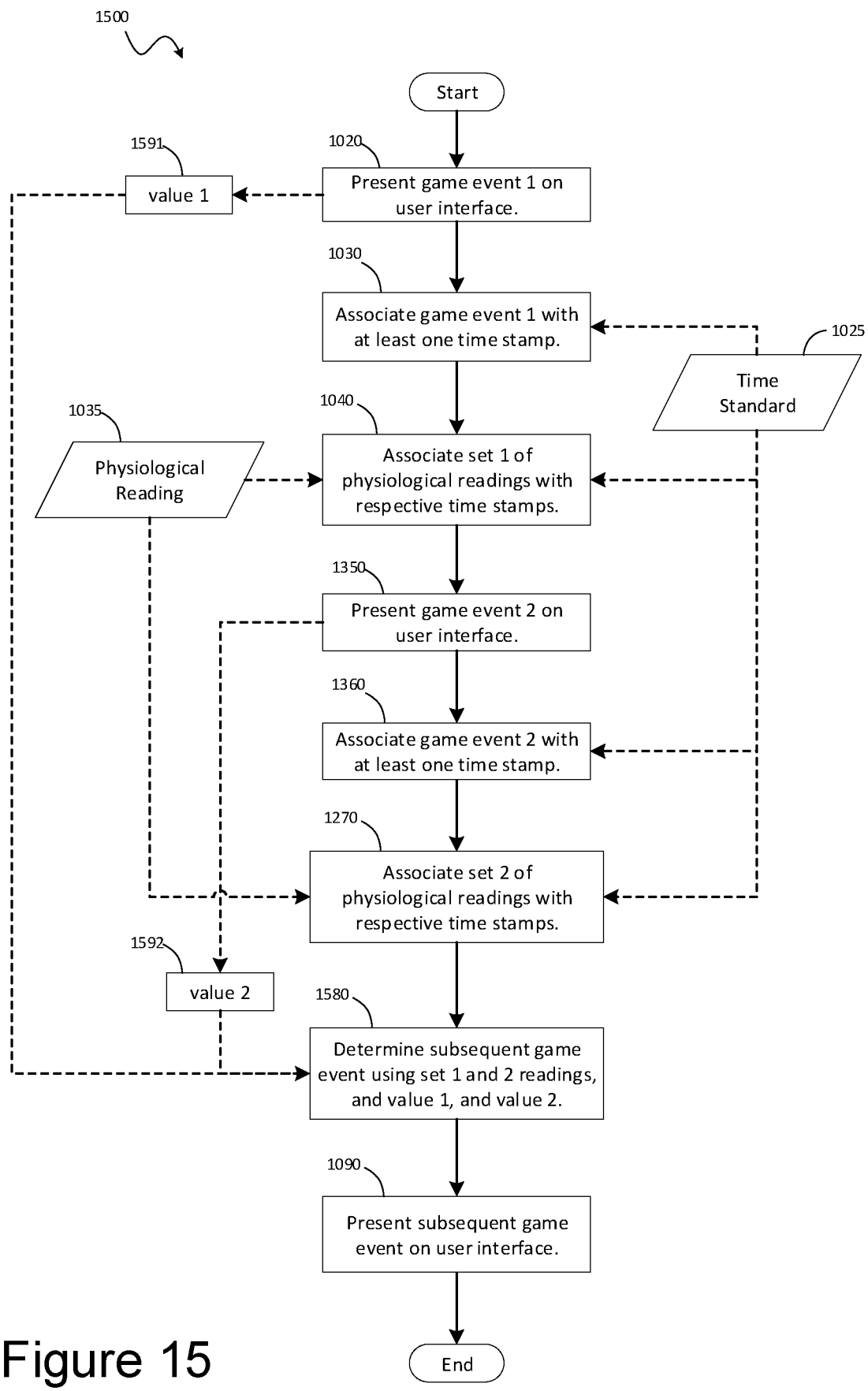
FIG. 15 presents a flowchart illustrating a method for physiological influence of computer games using values corresponding to presented game events, according to certain embodiments of the present disclosure.

FIG. 15 presents a flowchart illustrating a method 1500 for physiological influence of computer games using values corresponding to presented game events, according to certain embodiments of the present disclosure. At block 1020, one or more processors (collectively "processing") present a game event on one or more user interfaces. At block 1030, processing associates the game event with a first set of one or more time stamps indicating a time at which the game event was presented on the one or more user interfaces. At block 1025, the time stamps are generated by one or more time-keeping means that share a common time standard. At block 1045, processing associates at least some physiological readings (1035) with respective time stamps. The readings (1035) indicate at least one physiological measure of a user who can perceive the game event presented by the one or more user interfaces. The respective time stamps associated with the readings (1035) share the same time standard (1025) as that used for the one or more time stamps associated with the game event. At block 1350, processing then presents a second game event on the one or more processors and, at block 1360, associates the second game event with a second set of one or more time stamps. At block 1270, processing associates a second set of one or more physiological readings (1035) with respective time stamps. The first set of readings is associated with time stamps indicating times occurring after the first set of one or more time stamps (the first game event) but before the second set of one or more time stamps (the second game event). The second set of readings is associated with time stamps indicating times occurring after both the first set of one or more time stamps (the first game event) and the second set of one or more time stamps (the second game event). At block 1580, processing determines a subsequent game event using: the first set of one or more readings, the second set of one or more readings, a first value (1591) corresponding to a measure of the first game event, and a second value (1592) corresponding to the measure of the second game event. At block 1090, processing then presents the subsequent game event on the one or more user interfaces and the method 1500 ends.

In some such embodiments, the physiological readings indicate heart beats and the game event metric is a measure of stimulus intensity. Examples of intensity measures could include sound volume or change in sound volume, display monitor brightness or change in brightness, or number or frequency of visual target stimuli. From the raw readings of heart activity, processing may determine a measure of heart rate variability (HRV) which may be associated with psychological stress. By presenting two game events of different stimulus intensity and determining HRV after each event, processing may determine the extent to which HRV is effected by varying stimulus intensity and select a subsequent game event calculated to elicit a target level of HRV. Those with experience in the art will understand that selecting a subsequent game event expected to elicit a target HRV may be achieved without calculating a number expressly representing the relationship between stimulus intensity and HRV.

In some such embodiments, readings indicate breath cycles the game event metric is stimulus frequency. Stimulus frequency could be represented by a variety of means, from the simple such as, for example, the flashing of a light to more complex images representing, for example, the opening and closing of a flower. In these embodiments, processing determines whether breath cycles are occurring at or near the same frequency as the frequency of the stimulus. Such embodiments could be used, for example, to reward the user for matching his or her breathing to the rate of the stimulus in the interval game event. If processing determines that breathing rate is close enough to the stimulus rate, the user may be presented with a subsequent game event comprising, for example, colorful images and pleasing music.

The game events in most computer games are influenced, if not determined, by game controls that may be consciously manipulated by the game's user. Common types of game controls include buttons, joysticks, turnable knobs and wheels, motion-detectors in the form of accelerometers and gyros, and cameras capturing images of the user coupled with logic to analyze the images. Outputs of the game controls often manifest themselves as outputs to one or more user interfaces, whether sounds or images representing particular actions. Some embodiments of the present disclosure may use outputs from game controls as well as readings from physiological sensors to determine a subsequent game event. While game control outputs may serve the usual purposes of allowing the user to manipulate the game environment, game control outputs may also provide insight into the user's physiological state. For example, if the user is instructed to react to game stimuli as quickly as possible, measuring the user's reaction time may provide insight into the user's level of fatigue. Game control outputs may also be treated as game events and physiological readings may be processed to determine physiological response to a game control action taken by the user.

As with game events and physiological readings, embodiments comprising outputs from game controls would associate at least some of those outputs with time stamps of the same time standard used to generate time stamps for game events and physiological readings. Time stamps may be indicative of when the outputs were generated. Time stamps allow processing to determine times at which game control outputs occur relative to game events and physiological readings.

Figure 16:
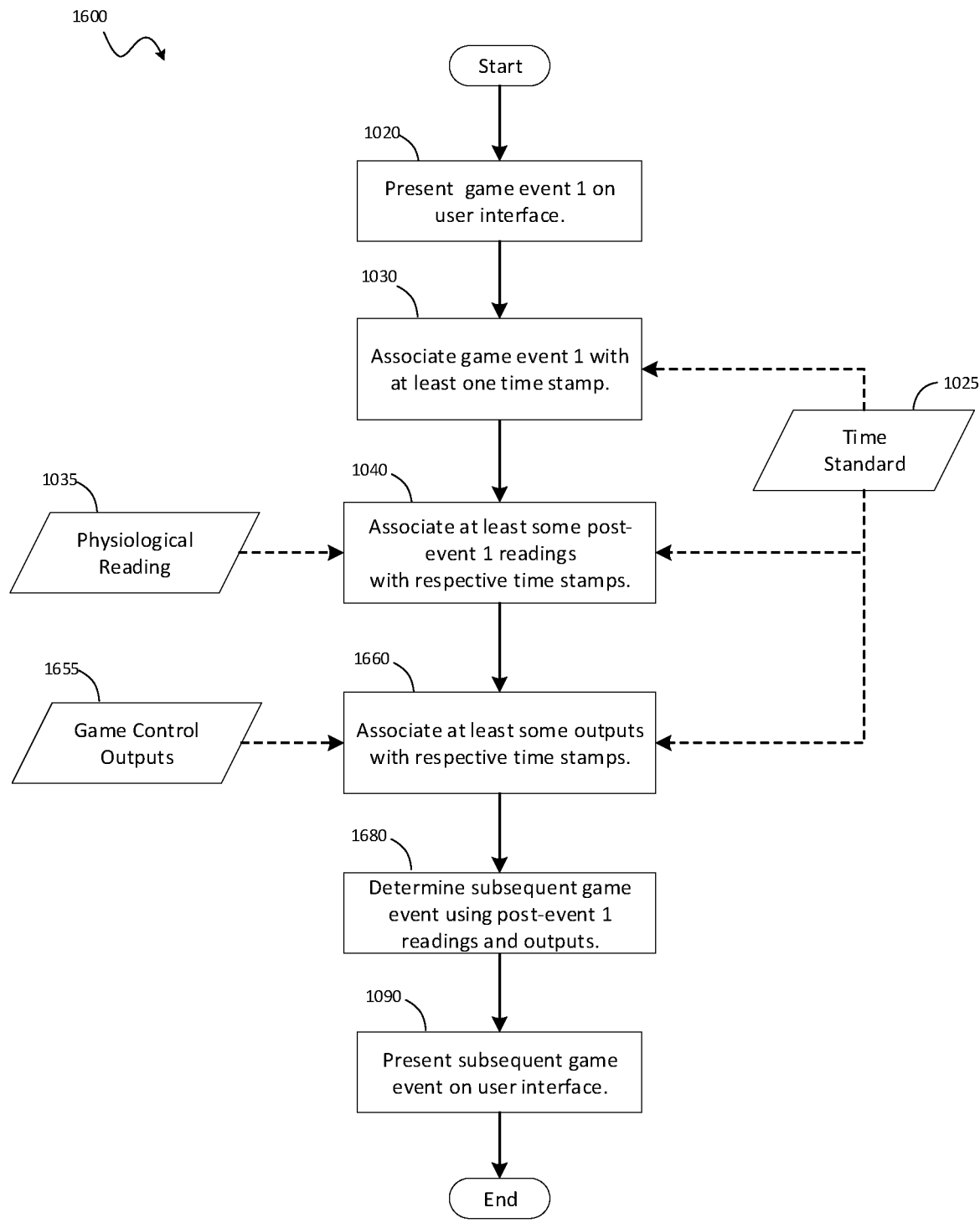
FIG. 16 presents a flowchart illustrating a method for physiological influence of computer games using game controller outputs and physiological readings to determine a subsequent game event, according to certain embodiments of the present disclosure.

FIG. 16 presents a flowchart illustrating a method 1600 for physiological influence of computer games using game controller outputs and physiological readings to determine a subsequent game event, according to certain embodiments of the present disclosure. At block 1020, one or more processors (collectively "processing") present a game event on one or more user interfaces. At block 1030, processing associates the game event with a first set of one or more time stamps indicating a time at which the game event was presented on the one or more user interfaces. At block 1025, the time stamps are generated by one or more time-keeping means that share a common time standard. At block 1045, processing associates at least some physiological readings (1035) with respective time stamps. The readings (1035) indicate at least one physiological measure of a user who can perceive the game event presented by the one or more user interfaces. The respective time stamps associated with the readings (1035) share the same time standard (1025) as that used for the one or more time stamps associated with the game event. At block 1660, processing associates at least some game control outputs (1655) with respective time stamps. The respective time stamps associated with the outputs (1655) share the same time standard (1025) as that used for the one or more time stamps associated with the game event and the respective time stamps associated with the physiological readings (1035). At block 1680, processing determines a subsequent game event using a first set of one or more readings associated with time stamps within various time ranges relative to the game event and at least some game control outputs. At least one reading of the first set of one or more readings is associated with at least one time stamp corresponding to a time occurring during or after the first set of one or more time stamps (indicating that at least one of the readings was generated after the start of the first game event). At block 1090, processing then presents the subsequent game event on the one or more user interfaces, and the method 1600 ends.

Figure 17:
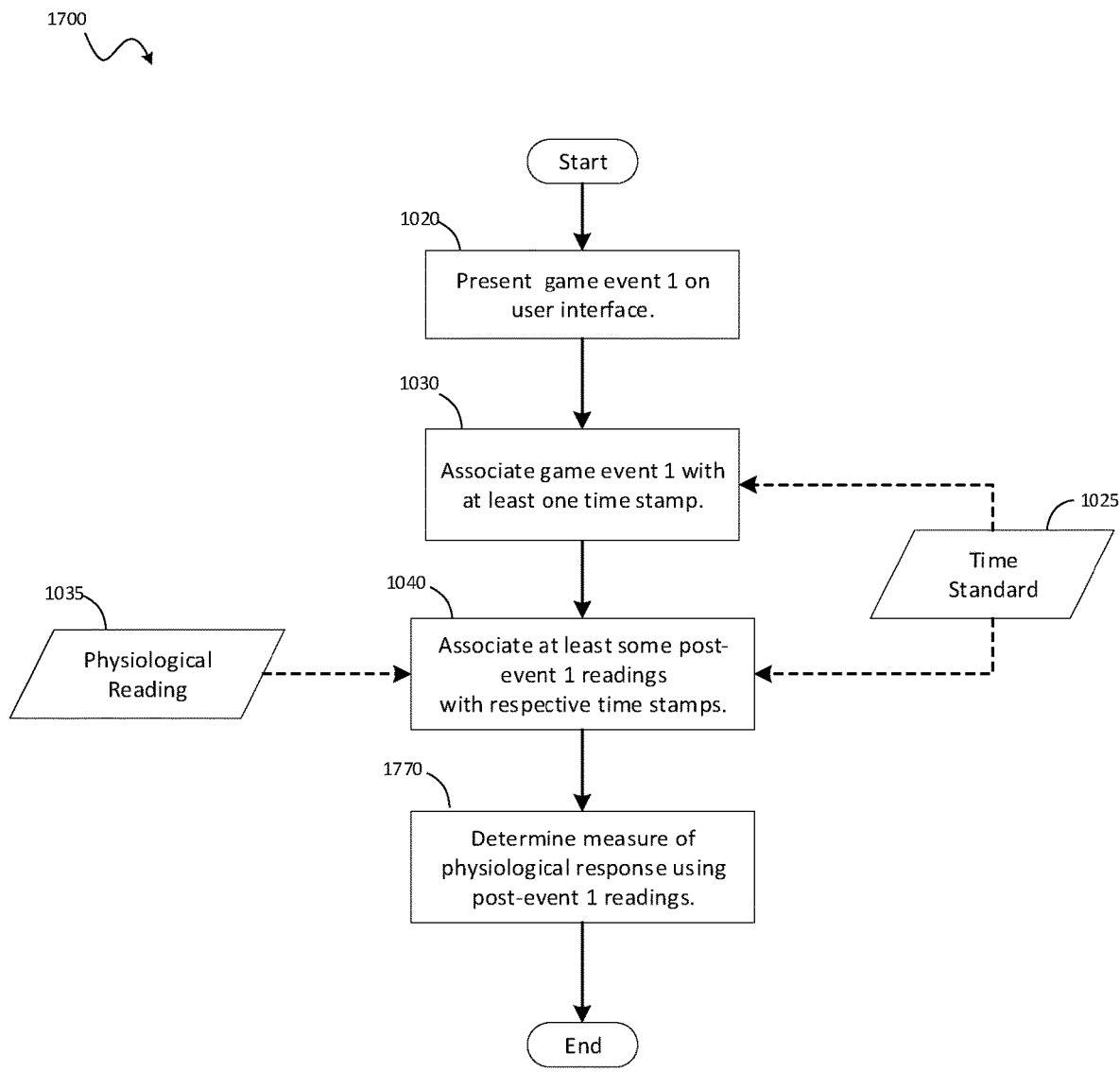
FIG. 17 presents a flowchart illustrating a method for determining physiological response to a computer game event, according to certain embodiments of the present disclosure.

FIG. 17 presents a flowchart illustrating a method 1700 for determining physiological response to a computer game event, according to certain embodiments of the present disclosure. At block 1020, one or more processors (collectively "processing") present a game event on one or more user interfaces. At block 1030, processing associates the game event with a first set of one or more time stamps indicating a time at which the game event was presented on the one or more user interfaces. At block 1025, the time stamps are generated by one or more time-keeping means that share a common time standard. At block 1045, processing associates at least some physiological readings (1035) with respective time stamps. The sensor readings (1035) indicate at least one physiological measure of a user who can perceive the game event presented by the one or more user interfaces. The respective time stamps associated with the readings (1035) share the same time standard (1025) as that used for the one or more time stamps associated with the game event. At block 1770, processing determines a measure of a physiological response to the game event using a first set of one or more readings, and the method 1700 ends.

Figure 18:
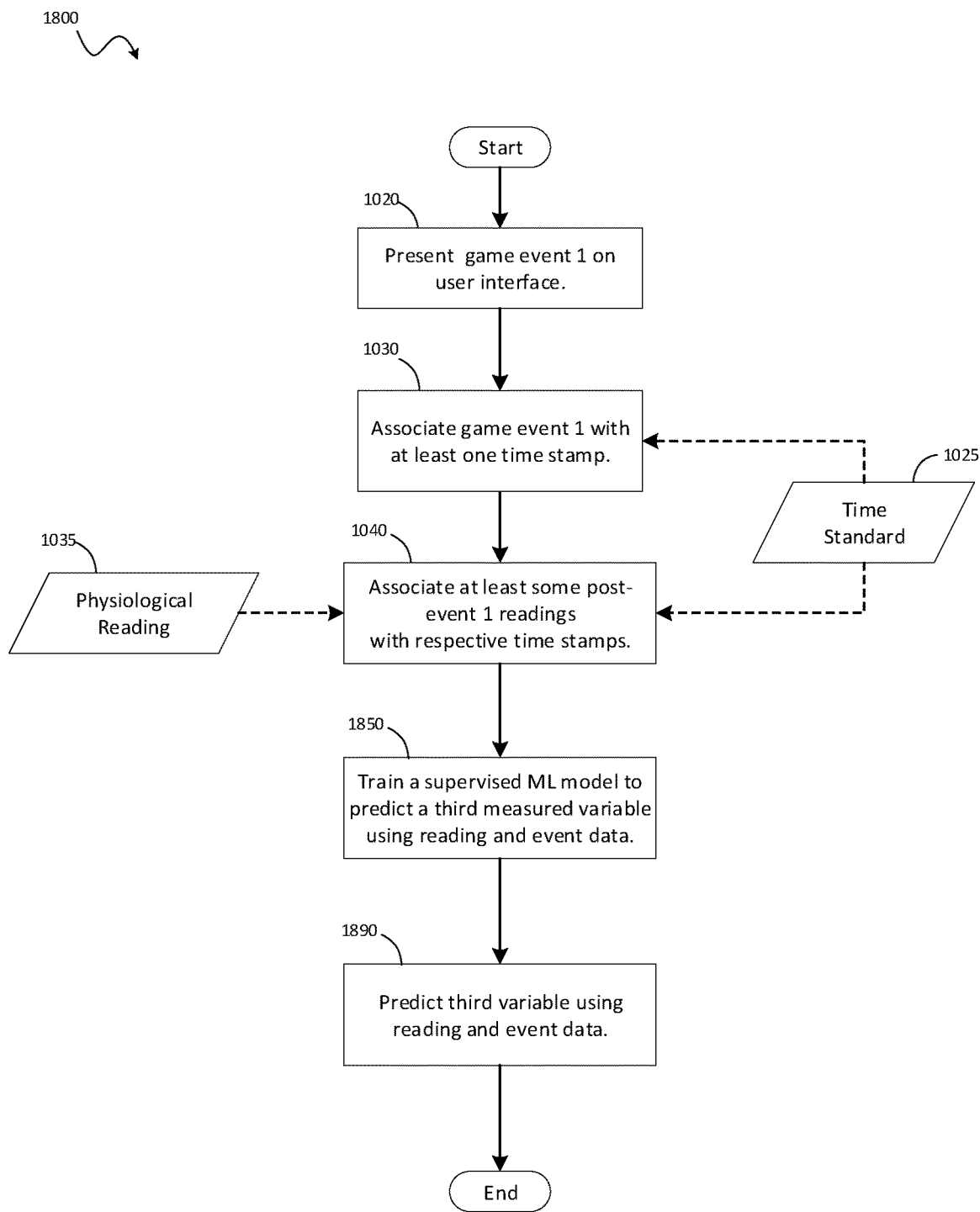
FIG. 18 presents a flowchart illustrating a method for predicting a third variable using game event data and physiological readings, according to certain embodiments of the present disclosure.

FIG. 18 presents a flowchart illustrating a method 1800 for predicting a third variable using game event data and physiological readings, according to certain embodiments of the present disclosure. At block 1020, one or more processors (collectively "processing") present a game event on one or more user interfaces. At block 1030, processing associates the game event with a first set of one or more time stamps indicating a time at which the game event was presented on the one or more user interfaces. At block 1025, the time stamps are generated by one or more time-keeping means that share a common time standard. At block 1045, processing associates at least some physiological readings (1035) with respective time stamps. The readings (1035) indicate at least one physiological measure of a user who can perceive the game event presented by the one or more user interfaces. The respective time stamps associated with the readings (1035) share the same time standard (1025) as that used for the one or more time stamps associated with the game event. At block 1850, processing trains a supervised machine learning model to predict a third measured variable using the time-stamped game event and time-stamped physiological reading. Examples of a third variable may include diagnoses of the user, treatments, the response (if any) of the diagnoses to the treatments either individually or in combination, or a cognitive trait of the user. At block 1890, processing then generates predictions of the third variable using time-stamped biosensor readings and time-stamped game events, and the method 1800 ends.

The above description is neither exclusive nor exhaustive and does not necessarily describe all possible embodiments (also called "examples") and is not intended to limit the scope of the claims. Embodiments may include elements in addition to those described and, in some cases, may contain only a subset of the elements described in a particular embodiment. Embodiments may contain any combination of elements in the described embodiments in addition to elements not expressly described. As used herein, the articles "a" and "an" may include one or more than one of the noun modified by either without respect to other uses of phrases such as "one or more" or "at least one." The word "or" is used inclusively unless otherwise indicated. Terms such as "first," "second," "third" and so forth are used as labels to distinguish elements and do not indicate sequential order unless otherwise indicated. In addition to the embodiments described above, embodiments include any that would fall within the scope of the claims, below.

What is claimed is:

1. A method comprising:
   presenting, by one or more processors and on one or more interfaces, a first instance of a first game event that is associated with a first set of one or more time stamps;
   receiving, by the one or more processors and from one or more sensors, a first set of sensor readings indicating at least one physiological measure of a user, wherein at least one reading of the first set of sensor readings is associated with a time stamp corresponding to a time occurring during or after the first set of one or more time stamps associated with the first game event;
   determining, by the one or more processors, a diagnosis of a user condition based on the first set of sensor readings including the at least one physiological measure of the user;
   determining, by the one or more processors, a subsequent game event based on the diagnosed user condition and using the first set of sensor readings,
      wherein the subsequent game event includes a modifiable criterion for determining completion of the subsequent game event,
      wherein the modifiable criterion for determining completion of the subsequent game event is associated with a specified physiological response to be elicited in the user to treat the user condition and for completion to occur, and
      wherein the modifiable criterion is modified based at least in part on one or more of the user condition and the first set of sensor readings; and
   presenting, by the one or more processors and on the one or more interfaces, the subsequent game event.

2. The method of claim 1 further comprising:
   determining the subsequent game event using a second set of sensor readings, at least one of the second set of sensor readings associated with a time stamp indicating a time occurring before any time stamp of the first set of one or more time stamps; and
   comparing a function of the first set of sensor readings to a function of the second set of sensor readings.

3. The method of claim 1 further comprising:
   presenting a second instance of the first game event on the one or more interfaces;
   associating the second instance of the first game event with a second set of one or more time stamps; and
   determining the subsequent game event using a second set of one or more readings, at least one reading of the second set of one or more readings being associated with a time stamp corresponding to a time occurring during or after the second set of time stamps.

4. The method of claim 3 further comprising:
   presenting a second instance of the first game event through the one or more interfaces;
   associating the second instance of the first game event with a third set of time stamps, at least one of the third set of time stamps corresponding to a time occurring:
   before a first time indicated by at least one of the second set of one or more time stamps; and
   after a second time indicated by at least one of the second set of one or more time stamps.

5. The method of claim 3 further comprising:
   presenting a second instance of the first game event through the one or more interfaces; and
   associating the second instance of the first game event with a third set of time stamps, at least one of the third set of time stamps corresponding to a time occurring within a maximum amount of time of a time indicated by at least one of the second set of one or more time stamps.

6. The method of claim 1 further comprising:
   presenting a second game event through the one or more interfaces;
   associating the second game event with a second set of one or more time stamps; and
   determining the subsequent game event using a second set of sensor readings, at least one reading of the second set of sensor readings associated with a time stamp corresponding to a time occurring during or after the second set of one or more time stamps.

7. The method of claim 6 in which:
   the one or more sensors comprise a sensor measuring heart activity;
   the one or more processors generate a first measure of heart rate variability using the first set of sensor readings;
   the one or more processors generate a second measure of heart rate variability using the second set of sensor readings; and
   the one or more processors determine the subsequent game event using a measure of a relationship between heart rate variability and stimulus intensity.

8. The method of claim 6 in which:
   the one or more sensors comprise a sensor measuring breathing of the user;
   the one or more processors generate a first measure of breathing rate using the first set of sensor readings;
   the one or more processors generate a second measure of breathing rate using the second set of sensor readings; and
   the one or more processors determine the subsequent game event using a measure of a relationship between breathing rate and stimulus rate.

9. The method of claim 1 comprising:
   receiving outputs from one or more game control devices, the outputs indicating actions of the user and associated with respective time stamps; and
   determining the subsequent game event using one or more of the outputs, at least one output of the one or more outputs associated with a time stamp corresponding to a time occurring during or after the first set of one or more time stamps.

10. The method of claim 1 wherein the first instance of the first game event is associated with an event data array comprising a time, a name, and one or more expected data fields, the one or more expected data fields defined for a type of the first game event.

11. The method of claim 1, wherein the subsequent game event is presented to the user as part of a treatment for diagnosed user condition, and wherein the diagnosed user condition is automatically and implicitly determined based on the first set of sensor readings.

12. The method of claim 1, further comprising:
receiving, from the one or more sensors, a second set of sensor readings indicating at least one physiological measure of the user;
determining whether the modifiable criterion for determining completion is satisfied based on whether the second set of sensor readings describe the specified physiological response elicited in the user responsive to the subsequent game event; and
responsive to determining whether the modifiable criterion for determining completion is satisfied one or more of:
determining a second subsequent game event based at least in part on the second set of sensor readings and presenting the second subsequent game event; and
modifying the diagnosed user condition associated with the user, wherein the diagnosed user condition is initially determined based on the first set of sensor readings.

13. A system comprising:
one or more processors; and
a memory storing instructions that, when executed by the one or more processors, cause the system to:
present, on one or more interfaces, a first instance of a first game event that is associated with a first set of one or more time stamps;
receive, from one or more sensors, a first set of sensor readings indicating at least one physiological measure of a user, wherein at least one reading of the first set of sensor readings being associated with a time stamp corresponding to a time occurring during or after the first set of one or more time stamps;
determine a subsequent game event using the first set of sensor readings,
wherein the subsequent game event includes a modifiable criterion for determining completion of the subsequent game event,
wherein the modifiable criterion for determining completion of the subsequent game event is associated with a specified physiological response to be elicited in the user to treat the user condition and for completion to occur, and
wherein the modifiable criterion is modified based at least in part on one or more of the user condition and the first set of sensor readings; and
present, on the one or more interfaces, the subsequent game event.

14. The system of claim 13, the memory further storing instructions that, when executed by the one or more processors, cause the system to:
determine the subsequent game event using a second set of sensor readings, at least one of the second set of sensor readings associated with a time stamp indicating a time occurring before any time stamp of the first set of one or more time stamps; and
compare a function of the first set of sensor readings to a function of the second set of sensor readings.

15. The system of claim 13, the memory further storing instructions that, when executed by the one or more processors, cause the system to:
present a second instance of the first game event on the one or more interfaces;
associating the second instance of the first game event with a second set of one or more time stamps; and
determine the subsequent game event using a second set of sensor readings, at least one reading of the second set of sensor readings being associated with a time stamp corresponding to a time occurring during or after the second set of time stamps.

16. The system of claim 15, the memory further storing instructions that, when executed by the one or more processors, cause the system to:
present a second instance of the first game event through the one or more interfaces;
associate the second instance of the first game event with a third set of time stamps, at least one of the third set of time stamps corresponding to a time occurring:
before a first time indicated by at least one of the second set of one or more time stamps; and
after a second time indicated by at least one of the second set of one or more time stamps.

17. The system of claim 15, the memory further storing instructions that, when executed by the one or more processors, cause the system to:
present a second instance of the first game event through the one or more interfaces; and
associate the second instance of the first game event with a third set of time stamps, at least one of the third set of time stamps corresponding to a time occurring within a maximum amount of time of a time indicated by at least one of the second set of one or more time stamps.

18. The system of claim 13, the memory further storing instructions that, when executed by the one or more processors, cause the system to:
present a second game event through the one or more interfaces;
associate the second game event with a second set of one or more time stamps; and
determine the subsequent game event using a second set of sensor readings, at least one reading of the second set of sensor readings associated with a time stamp corresponding to a time occurring during or after the second set of one or more time stamps.

19. The system of claim 13, the memory further storing instructions that, when executed by the one or more processors, cause the system to:
receive outputs from one or more game control devices, the outputs indicating actions of the user and associated with respective time stamps; and
determine the subsequent game event using one or more of the outputs, at least one output of the one or more outputs associated with a time stamp corresponding to a time occurring during or after the first set of one or more time stamps.

20. The system of claim 13, wherein the first instance of the first game event is associated with an event data array comprising a time, a name, and one or more expected data fields, the one or more expected data fields defined for a type of the first game event.

* * * * *